US012687499B2

(12) United States Patent　(10) Patent No.:　US 12,687,499 B2
Matsumoto　(45) Date of Patent:　Jul. 21, 2026

(54) INFORMATION PROCESSING APPARATUS, INFORMATION PROCESSING METHOD, AND INFORMATION PROCESSING PROGRAM

(71) Applicant: FUJIFILM Corporation, Tokyo (JP)

(72) Inventor: Kazuma Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 424 days.

(21) Appl. No.: 18/321,034

(22) Filed: May 22, 2023

(65) Prior Publication Data

US 2023/0296531 A1　Sep. 21, 2023

Related U.S. Application Data

(63) Continuation of application No. PCT/JP2021/043004, filed on Nov. 24, 2021.

(30) Foreign Application Priority Data

Nov. 27, 2020　(JP) ................................. 2020-196732

(51) Int. Cl.
　*G01N 21/88*　(2006.01)
　*G06T 5/50*　(2006.01)
　(Continued)

(52) U.S. Cl.
　CPC ........... *G01N 21/8851* (2013.01); *G06T 5/50* (2013.01); *G06T 5/80* (2024.01); *G06T 7/33* (2017.01);
　(Continued)

(58) Field of Classification Search
　CPC ........... G01N 21/8851; G01N 21/9515; G01N 2021/8867; G06T 5/50; G06T 5/80;
　(Continued)

(56) References Cited

U.S. PATENT DOCUMENTS 11,523,013 B2　12/2022　Yonaha
2015/0055846 A1　2/2015　Haque
(Continued)

FOREIGN PATENT DOCUMENTS

CN　108431585 A　8/2018
CN　110188777 A　8/2019
(Continued)

OTHER PUBLICATIONS

The extended European search report issued by the European Patent Office on Apr. 16, 2024, which corresponds to European Patent Application No. 21897978.9-1218 and is related to U.S. Appl. No. 18/321,034.
(Continued)

*Primary Examiner* — Matthew C Bella
*Assistant Examiner* — Janice E. Vaz
(74) *Attorney, Agent, or Firm* — Studebaker Brackett PLLC

(57)　ABSTRACT

An information processing apparatus acquires a first image obtained by capturing an image of a structure and first damage information of the structure extracted from the first image; acquires a second image obtained by capturing an image of the structure at a time point different from a time point at which the first image is captured and second damage information of the structure extracted from the second image; extracts feature points from the first image; extracts feature points from the second image; searches for corresponding feature points between the first image and the second image; performs coarse registration followed by fine registration on the first damage information and the second damage information based on information on the corresponding feature points to perform registration between the first damage information and the second damage information; and calculates a difference between the first damage
(Continued)

information and the second damage information after the registration.

21 Claims, 31 Drawing Sheets

(51) Int. Cl.

| | |
|---|---|
| *G06T 5/80* | (2024.01) |
| *G06T 7/33* | (2017.01) |
| *G06T 7/60* | (2017.01) |
| *G06V 10/44* | (2022.01) |
| *G06V 10/74* | (2022.01) |

(52) U.S. Cl.
CPC ............... *G06T 7/60* (2013.01); *G06V 10/44* (2022.01); *G06V 10/761* (2022.01); *G06T 2207/20221* (2013.01)

(58) Field of Classification Search
CPC ... G06T 7/33; G06T 7/60; G06T 2207/20221; G06T 2207/30184; G06T 7/0004; G06V 10/44; G06V 10/761
See application file for complete search history.

(56) References Cited

U.S. PATENT DOCUMENTS

| | | | |
|---|---|---|---|
| 2017/0091919 A1* | 3/2017 | Karino | .................. G06V 20/653 |
| 2018/0292328 A1 | 10/2018 | Karube | |
| 2020/0103353 A1 | 4/2020 | Kuwabara | |
| 2020/0184649 A1 | 6/2020 | Wang | |
| 2021/0082086 A1* | 3/2021 | Bichu | ........................ G06T 5/80 |
| 2021/0358102 A1* | 11/2021 | Zhao | .................... H04N 23/661 |

FOREIGN PATENT DOCUMENTS

| | | | | |
|---|---|---|---|---|
| CN | 110998655 | A | | 4/2020 |
| JP | 2004-309492 | A | | 11/2004 |
| JP | 2009-162718 | A | | 7/2009 |
| JP | 2014-126893 | A | | 7/2014 |
| JP | 2017-063936 | A | | 4/2017 |
| JP | 2019-070631 | A | | 5/2019 |
| JP | 2019211277 | A | * | 12/2019 |
| JP | 2020-052786 | A | | 4/2020 |
| JP | 2020-096325 | A | | 6/2020 |
| KR | 10-2040435 | B1 | | 11/2019 |
| WO | 2014-065055 | A1 | | 5/2014 |
| WO | 2017/110278 | A1 | | 6/2017 |
| WO | 2019/044077 | A1 | | 3/2019 |
| WO | 2020/137405 | A1 | | 7/2020 |

OTHER PUBLICATIONS

International Search Report issued in PCT/JP2021/043004; mailed Feb. 15, 2022.
International Preliminary Report on Patentability (Chapter I) and Written Opinion of the International Searching Authority issued in PCT/JP2021/043004; issued May 30, 2023.
An Office Action, "Notice of Reasons for Refusal," mailed by the Japanese Patent Office on Oct. 14, 2025, which corresponds to Japanese Patent Application No. 2022-565375 and is related to U.S. Appl. No. 18/321,034; with English language translation.
Office Action issued in CN 202180079487.5; mailed by the State Intellectual Property Office of the People's Republic of China on Dec. 25, 2025.

* cited by examiner

| GROUP ID | VECTOR ID | START POINT | | END POINT | | LENGTH (mm) | WIDTH (mm) |
|---|---|---|---|---|---|---|---|
| | | POINT NUMBER | COORDINATES | POINT NUMBER | COORDINATES | | |
| C1 | C1-1 | P1 | (X1, Y1) | P2 | (X2, Y2) | 100 | 1 |
| | C1-2 | P2 | (X2, Y2) | P3 | (X3, Y3) | 50 | 1 |
| | C1-3 | P3 | (X3, Y3) | P4 | (X4, Y4) | 30 | 1 |
| | C1-4 | P4 | (X4, Y4) | P5 | (X5, Y5) | 60 | 1 |
| | C1-5 | P5 | (X5, Y5) | P6 | (X6, Y6) | 25 | 1 |
| | C1-6 | P6 | (X6, Y6) | P7 | (X7, Y7) | 25 | 1 |

CRACK INFORMATION

FIG. 7

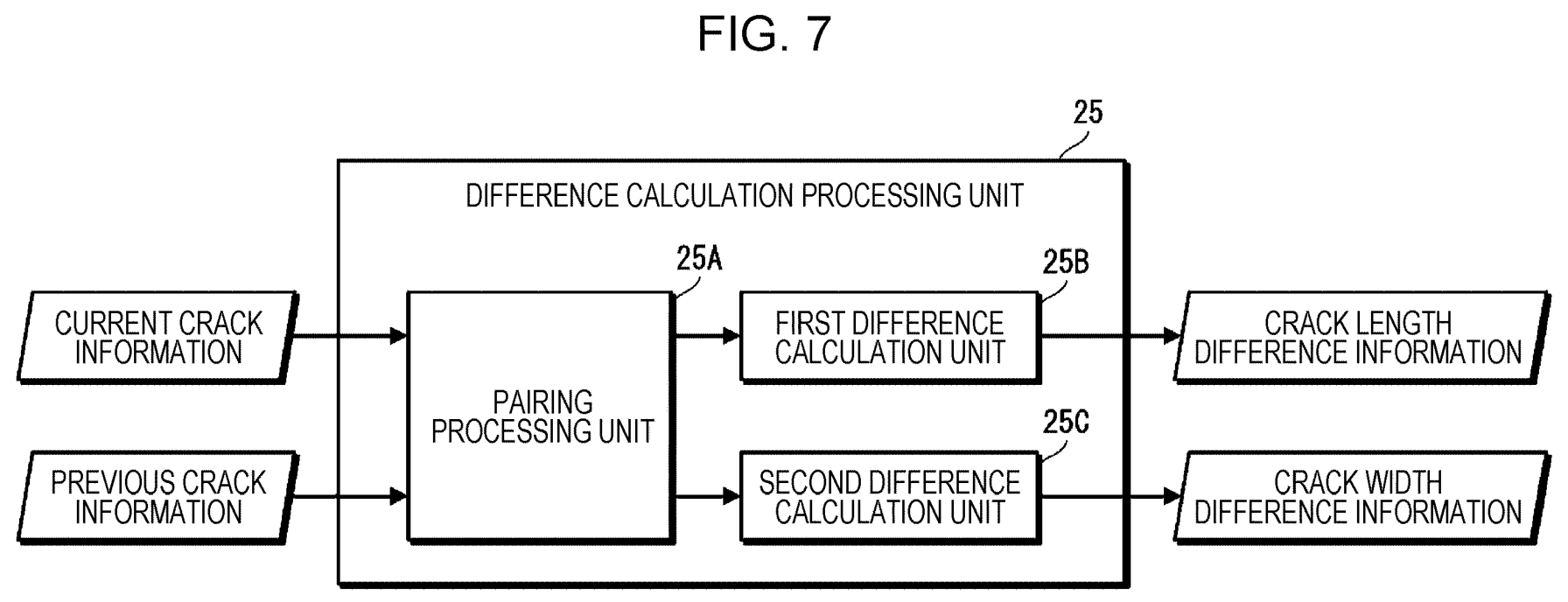

CRACK LENGTH DIFFERENCE INFORMATION

CRACK WIDTH DIFFERENCE INFORMATION

25

DIFFERENCE CALCULATION PROCESSING UNIT

25A

PAIRING PROCESSING UNIT

25B

FIRST DIFFERENCE CALCULATION UNIT

25C

SECOND DIFFERENCE CALCULATION UNIT

CURRENT CRACK INFORMATION

PREVIOUS CRACK INFORMATION (RED): CRACK ONLY IN CURRENT IMAGE
(GREEN): CRACK ONLY IN PREVIOUS IMAGE
(BROKEN LINE): CRACK COMMON TO CURRENT AND PREVIOUS IMAGES

Figure 20:
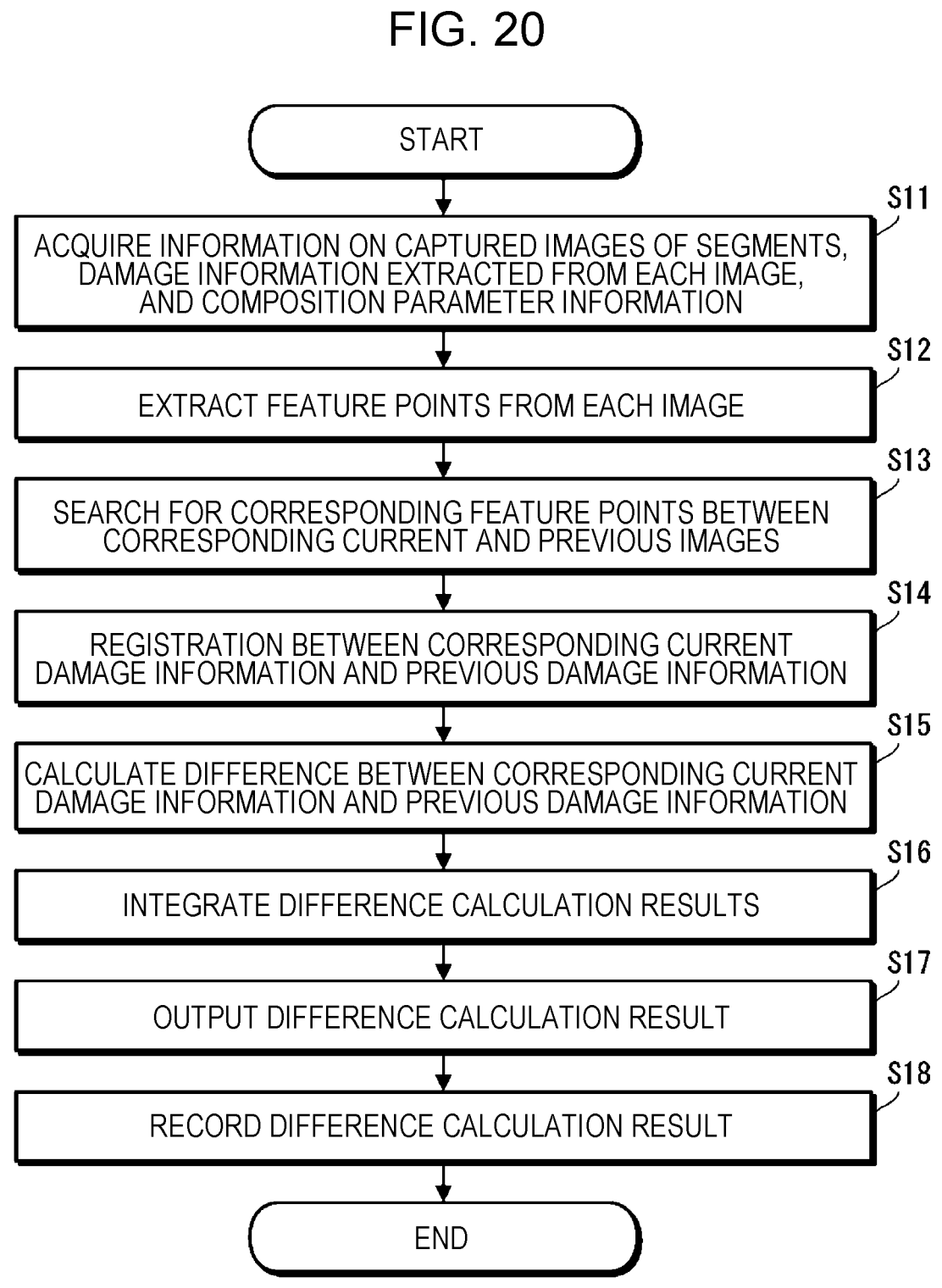

START

S11

ACQUIRE INFORMATION ON CAPTURED IMAGES OF SEGMENTS, DAMAGE INFORMATION EXTRACTED FROM EACH IMAGE, AND COMPOSITION PARAMETER INFORMATION

S12

EXTRACT FEATURE POINTS FROM EACH IMAGE

S13

SEARCH FOR CORRESPONDING FEATURE POINTS BETWEEN CORRESPONDING CURRENT AND PREVIOUS IMAGES

S14

REGISTRATION BETWEEN CORRESPONDING CURRENT DAMAGE INFORMATION AND PREVIOUS DAMAGE INFORMATION

S15

CALCULATE DIFFERENCE BETWEEN CORRESPONDING CURRENT DAMAGE INFORMATION AND PREVIOUS DAMAGE INFORMATION

S16

INTEGRATE DIFFERENCE CALCULATION RESULTS

S17

OUTPUT DIFFERENCE CALCULATION RESULT

S18

RECORD DIFFERENCE CALCULATION RESULT

END

||

IC22

|

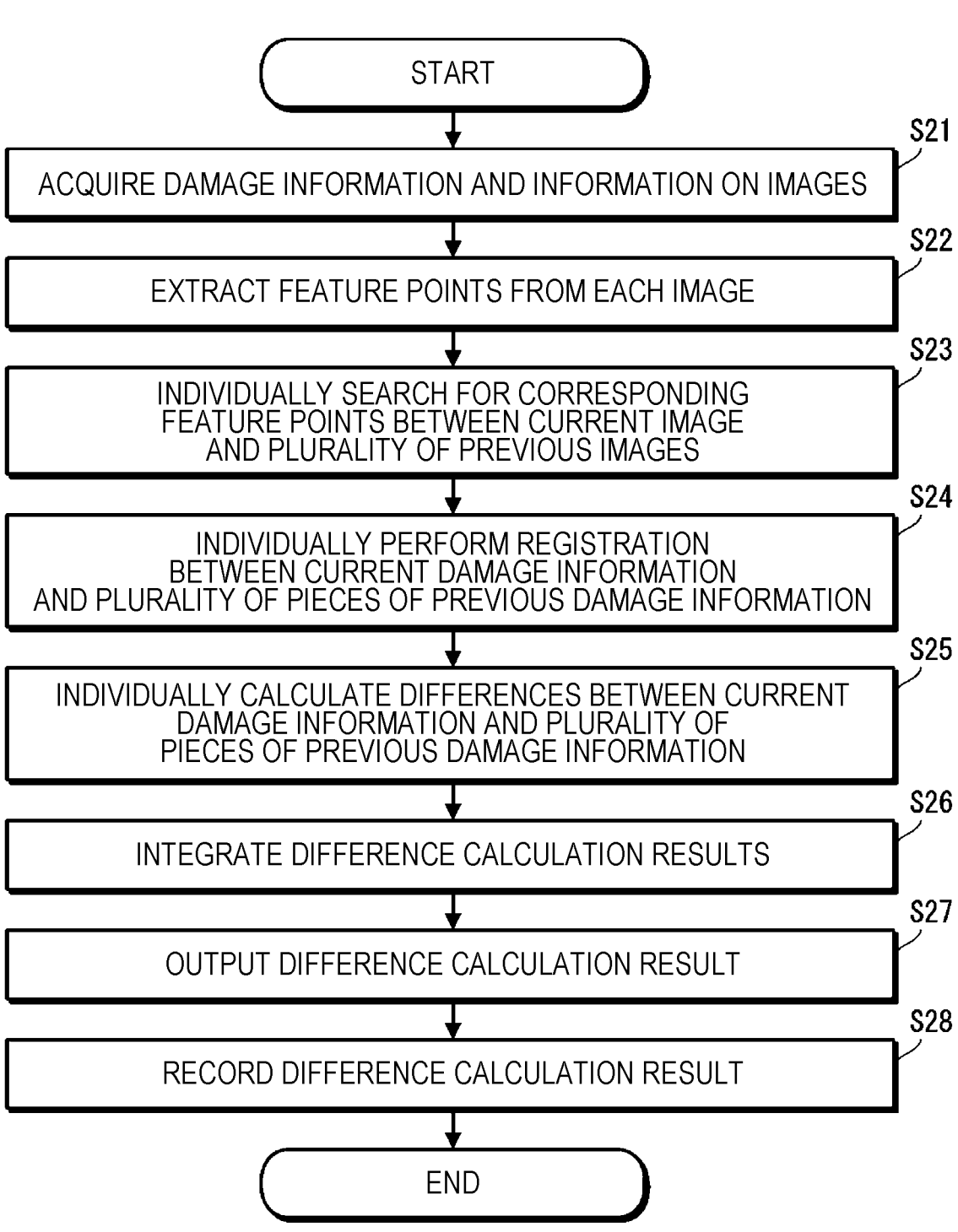

START

S21
ACQUIRE DAMAGE INFORMATION AND INFORMATION ON IMAGES

S22
EXTRACT FEATURE POINTS FROM EACH IMAGE

S23
INDIVIDUALLY SEARCH FOR CORRESPONDING
FEATURE POINTS BETWEEN CURRENT IMAGE
AND PLURALITY OF PREVIOUS IMAGES

S24
INDIVIDUALLY PERFORM REGISTRATION
BETWEEN CURRENT DAMAGE INFORMATION
AND PLURALITY OF PIECES OF PREVIOUS DAMAGE INFORMATION

S25
INDIVIDUALLY CALCULATE DIFFERENCES BETWEEN CURRENT
DAMAGE INFORMATION AND PLURALITY OF
PIECES OF PREVIOUS DAMAGE INFORMATION

S26
INTEGRATE DIFFERENCE CALCULATION RESULTS

S27
OUTPUT DIFFERENCE CALCULATION RESULT

S28
RECORD DIFFERENCE CALCULATION RESULT

END

FIG. 31

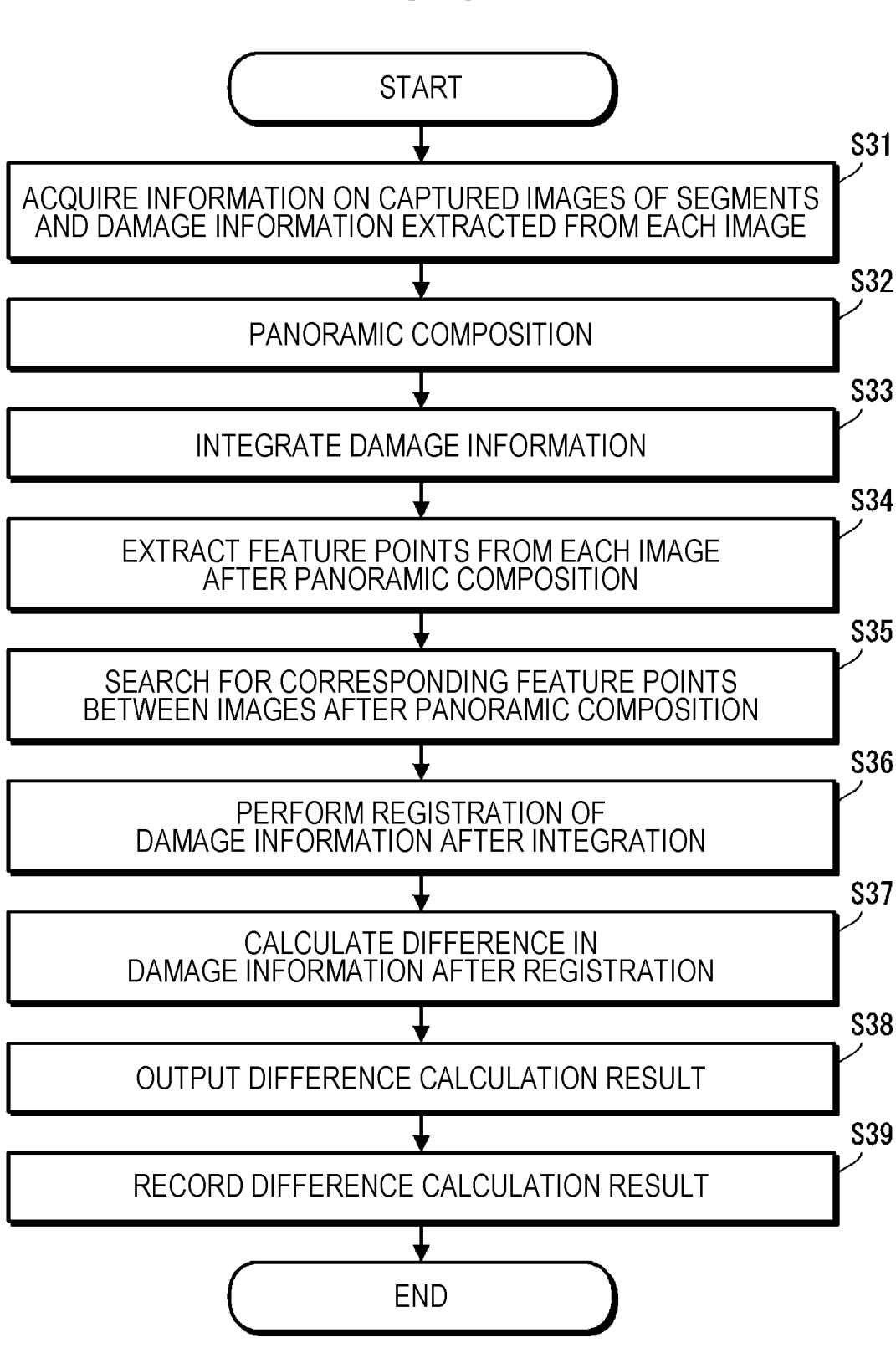

START

ACQUIRE INFORMATION ON CAPTURED IMAGES OF SEGMENTS
AND DAMAGE INFORMATION EXTRACTED FROM EACH IMAGE — S31

PANORAMIC COMPOSITION — S32

INTEGRATE DAMAGE INFORMATION — S33

EXTRACT FEATURE POINTS FROM EACH IMAGE
AFTER PANORAMIC COMPOSITION — S34

SEARCH FOR CORRESPONDING FEATURE POINTS
BETWEEN IMAGES AFTER PANORAMIC COMPOSITION — S35

PERFORM REGISTRATION OF
DAMAGE INFORMATION AFTER INTEGRATION — S36

CALCULATE DIFFERENCE IN
DAMAGE INFORMATION AFTER REGISTRATION — S37

OUTPUT DIFFERENCE CALCULATION RESULT — S38

RECORD DIFFERENCE CALCULATION RESULT — S39

END

INFORMATION PROCESSING APPARATUS, INFORMATION PROCESSING METHOD, AND INFORMATION PROCESSING PROGRAM

CROSS-REFERENCE TO RELATED APPLICATIONS

The present application is a Continuation of PCT International Application No. PCT/JP2021/043004 filed on Nov. 24, 2021 claiming priority under 35 U.S.C. § 119(a) to Japanese Patent Application No. 2020-196732 filed on Nov. 27, 2020. Each of the above applications is hereby expressly incorporated by reference, in its entirety, into the present application.

BACKGROUND OF THE INVENTION

1. Field of the Invention

The present invention relates to information processing apparatuses, information processing methods, and information processing programs, and more specifically to an information processing apparatus, an information processing method, and an information processing program for processing structure damage information extracted from an image.

2. Description of the Related Art

Social infrastructure such as bridges, dams, and tunnels requires regular inspections once every several years. For example, bridges require regular inspections once every five years. A known technique for supporting this work is to automatically extract damage (such as cracks and free lime) appearing on surfaces of a structure from a captured image of the structure (e.g., JP2020-52786A and JP2020-96325A).

SUMMARY OF THE INVENTION

An administrator of a structure determines whether to repair the structure, the timing of repair, and the like on the basis of the results of the regular inspections. At this time, there are needs to determine matters related to the repair in consideration of not only the current state of deterioration of the structure but also information on differences from previous inspection results. This is because information on differences from previous inspection results can be used to predict the future state of deterioration. However, it is difficult to accurately determine differences from previous inspection results, and such determination is not currently performed.

The present invention has been made in view of such circumstances, and an object thereof is to provide an information processing apparatus, an information processing method, and an information processing program that enable accurate calculation of a difference in damage information.

(1) An information processing apparatus including a processor configured to acquire a first image obtained by capturing an image of a structure and first damage information of the structure extracted from the first image; acquire a second image obtained by capturing an image of the structure at a time point different from a time point at which the first image is captured and second damage information of the structure extracted from the second image; extract a plurality of feature points from the first image; extract a plurality of feature points from the second image; search for corresponding feature points between the first image and the second image; perform coarse registration followed by fine registration on the first damage information and the second damage information on the basis of information on the corresponding feature points to perform registration between the first damage information and the second damage information; and calculate a difference between the first damage information and the second damage information after the registration.

(2) The information processing apparatus according to (1), in which the processor is configured to perform rigid registration as the coarse registration; and perform non-rigid registration as the fine registration.

(3) The information processing apparatus according to (1), in which the processor is configured to perform rigid registration as the coarse registration; and perform, as the fine registration, registration by correcting a difference in lens distortion.

(4) The information processing apparatus according to any one of (1) to (3), in which the first damage information and the second damage information are crack information, and the processor is configured to calculate a difference in crack width and/or length.

(5) The information processing apparatus according to (4), in which the processor is configured to generate a pair of corresponding cracks and calculate a difference in width between the corresponding cracks in the pair to calculate a difference in crack width.

(6) The information processing apparatus according to (4), in which the processor is configured to generate a pair of corresponding cracks and calculate a length of a crack that is not paired to calculate a difference in crack length.

(7) The information processing apparatus according to (5) or (6), in which the processor is configured to generate a pair of adjacent cracks.

(8) The information processing apparatus according to (5) or (6), in which the processor is configured to generate a pair of corresponding cracks by DP matching.

(9) The information processing apparatus according to any one of (1) to (3), in which the first damage information and the second damage information are damaged-region information, and the processor is configured to calculate a difference between corresponding damaged regions.

(10) The information processing apparatus according to any one of (1) to (9), in which in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the processor is configured to individually extract a plurality of feature points from the first images; individually extract a plurality of feature points from the second images; search for corresponding feature points between a first image and a second image that correspond to each other among the first images and the second images; perform registration between a piece of first damage information and a piece of second damage information that correspond to each other among the pieces of first damage information and the pieces of second damage information; and calculate a difference between the piece of first damage information and the piece of second damage information that correspond to each other.

(11) The information processing apparatus according to (10), in which the processor is configured to acquire composition processing information necessary for panoramic composition of the plurality of first images; and combine differences, each calculated between one of the first images and a corresponding one of the second images, on the basis of the composition processing information.

(12) The information processing apparatus according to any one of (1) to (9), in which in a case where a plurality of second images, each having an image capturing area that partially overlaps an image capturing area of the first image, and a plurality of pieces of second damage information extracted from the plurality of second images are acquired, the processor is configured to individually extract a plurality of feature points from the second images; individually search for corresponding feature points between the first image and each of the second images; individually perform registration between the first damage information and each of the pieces of second damage information; individually calculate differences between the first damage information and the pieces of second damage information; and combine the differences individually calculated between the first damage information and the pieces of second damage information.

(13) The information processing apparatus according to any one of (1) to (9), in which the processor is configured to extract a region in which a difference between the first damage information and the second damage information is calculable, in the first image and the second image; and output information on the extracted region.

(14) The information processing apparatus according to (13), in which the processor is configured to generate an image in which the region in which the difference is calculable is indicated in the first image and output the generated image to a display destination when outputting information on the region in which the difference is calculable.

(15) The information processing apparatus according to any one of (1) to (9), in which in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the processor is configured to perform panoramic composition of the plurality of first images; combine the plurality of pieces of first damage information on the basis of composition processing information for the panoramic composition of the plurality of first images; perform panoramic composition of the plurality of second images; combine the plurality of pieces of second damage information on the basis of composition processing information for the panoramic composition of the plurality of second images; extract a plurality of feature points from a first image obtained after the panoramic composition; extract a plurality of feature points from a second image obtained after the panoramic composition; search for corresponding feature points between the first image obtained after the panoramic composition and the second image obtained after the panoramic composition; perform registration between first damage information obtained after combining of the plurality of pieces of first damage information and second damage information obtained after combining of the plurality of pieces of second damage information; and calculate a difference between the first damage information obtained after combining of the plurality of pieces of first damage information and the second damage information obtained after combining of the plurality of pieces of second damage information.

(16) An information processing method including acquiring a first image obtained by capturing an image of a structure and first damage information of the structure extracted from the first image; acquiring a second image obtained by capturing an image of the structure at a time point different from a time point at which the first image is captured and second damage information of the structure extracted from the second image; extracting a plurality of feature points from the first image; extracting a plurality of feature points from the second image; searching for corresponding feature points between the first image and the second image; performing coarse registration followed by fine registration on the first damage information and the second damage information on the basis of information on the corresponding feature points to perform registration between the first damage information and the second damage information; and calculating a difference between the first damage information and the second damage information after the registration.

(17) An information processing program for causing a computer to implement acquiring a first image obtained by capturing an image of a structure and first damage information of the structure extracted from the first image; acquiring a second image obtained by capturing an image of the structure at a time point different from a time point at which the first image is captured and second damage information of the structure extracted from the second image; extracting a plurality of feature points from the first image; extracting a plurality of feature points from the second image; searching for corresponding feature points between the first image and the second image; performing coarse registration followed by fine registration on the first damage information and the second damage information on the basis of information on the corresponding feature points to perform registration between the first damage information and the second damage information; and calculating a difference between the first damage information and the second damage information after the registration.

According to the present invention, it is possible to accurately calculate a difference in damage information.

BRIEF DESCRIPTION OF THE DRAWINGS

FIG. 7 is a block diagram of functions of a difference calculation processing unit;

FIG. 17 is a conceptual diagram illustrating correction of a difference in lens distortion;

FIG. 19 is a diagram illustrating a correspondence relationship between current and previous captured images of segments;

FIG. 20 is a flowchart illustrating a procedure of a process for calculating a difference in damage information;

FIG. 21 is a conceptual diagram of an imaging range;

FIG. 24 is a conceptual diagram of a process for calculating a difference in crack length;

FIG. 26 is a flowchart illustrating a procedure of a process for calculating a difference in damage information;

FIG. 31 is a flowchart illustrating a procedure of a process for calculating a difference in damage information.

DESCRIPTION OF THE PREFERRED EMBODIMENTS

Preferred embodiments of the present invention will be described in detail hereafter with reference to the accompanying drawings.

First Embodiment

Here, description will be made taking as an example a case where upon extraction of cracks from a captured image of a structure, a difference from a previous inspection result of the extracted cracks is calculated. Information on the cracks extracted from the image is an example of damage information.

Hardware Configuration of Information Processing Apparatus

Figure 1:
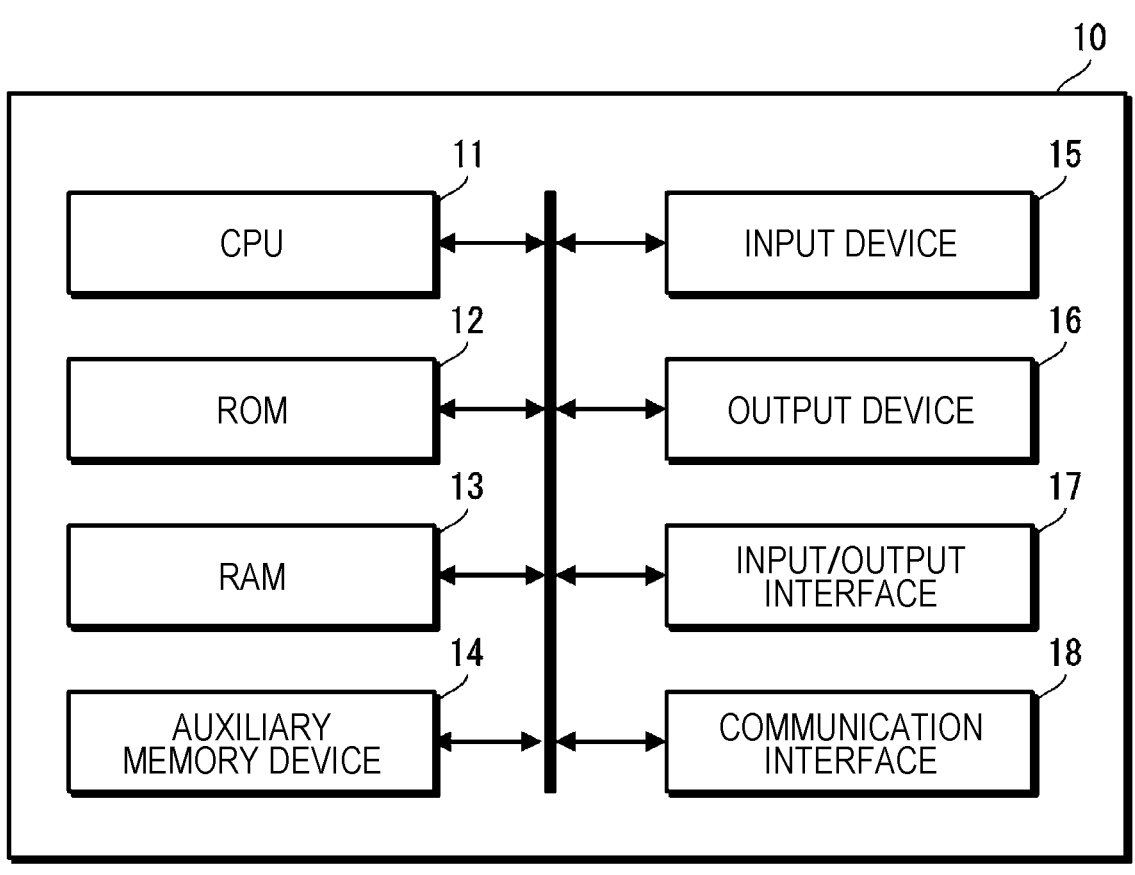
FIG. 1 is a block diagram illustrating an example hardware configuration of an information processing apparatus.

FIG. 1 is a block diagram illustrating an example hardware configuration of an information processing apparatus.

An information processing apparatus 10 is constituted by a general-purpose computer such as a personal computer, for example. As illustrated in FIG. 1, the information processing apparatus 10 mainly includes a central processing unit (CPU) 11, a read only memory (ROM) 12, a random access memory (RAM) 13, an auxiliary memory device 14, an input device 15, an output device 16, an input/output interface 17, a communication interface 18, and so on.

The CPU 11 is an example of a processor. The CPU 11 executes a predetermined program (information processing program) to allow the computer constituting the information processing apparatus 10 to function as an information processing apparatus. The program to be executed by the CPU 11 is stored in the ROM 12 or the auxiliary memory device 14.

The auxiliary memory device 14 constitutes a storage unit of the information processing apparatus 10. The auxiliary memory device 14 is constituted by, for example, a hard disk drive (HDD), a solid state drive (SSD), or the like.

The input device 15 constitutes an operating unit of the information processing apparatus 10. The input device 15 is constituted by, for example, a keyboard, a mouse, a touch panel, or the like.

The output device 16 constitutes a display unit of the information processing apparatus 10. The output device 16 is constituted by, for example, a display such as a liquid crystal display or an organic electro-luminescence (EL) display, or the like.

The input/output interface 17 constitutes a connection unit of the information processing apparatus 10. The information processing apparatus 10 is connected to an external device via the input/output interface 17.

The communication interface 18 constitutes a communication unit of the information processing apparatus 10. The information processing apparatus 10 is connected to a network (e.g., the Internet) via the communication interface 18.

Functions of Information Processing Apparatus

Figure 2:
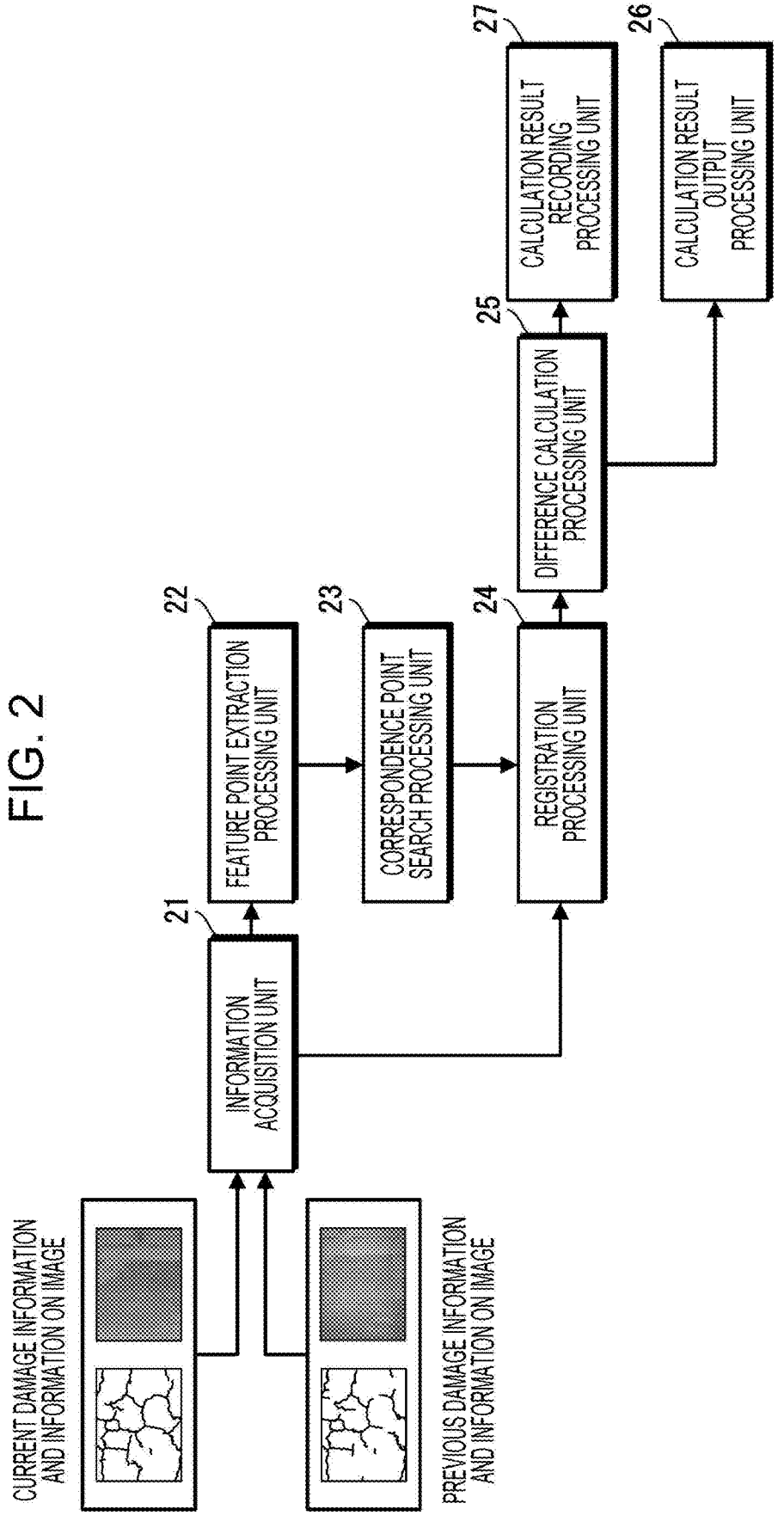
FIG. 2 is a block diagram of functions of the information processing apparatus.

FIG. 2 is a block diagram of functions of the information processing apparatus.

The information processing apparatus 10 has the functions of an information acquisition unit 21, a feature point extraction processing unit 22, a correspondence point search processing unit 23, a registration processing unit 24, a difference calculation processing unit 25, a calculation result output processing unit 26, and a calculation result recording processing unit 27 to calculate a difference in damage information. These functions are implemented by the CPU 11 executing a predetermined program (information processing program).

In this embodiment, it is assumed that crack extraction processing has been completed in advance. Extracted crack information (damage information) is stored in the auxiliary memory device 14 in association with information on an image as the source of extraction. The information on the cracks is converted into vector data and recorded, for example.

Figure 3:
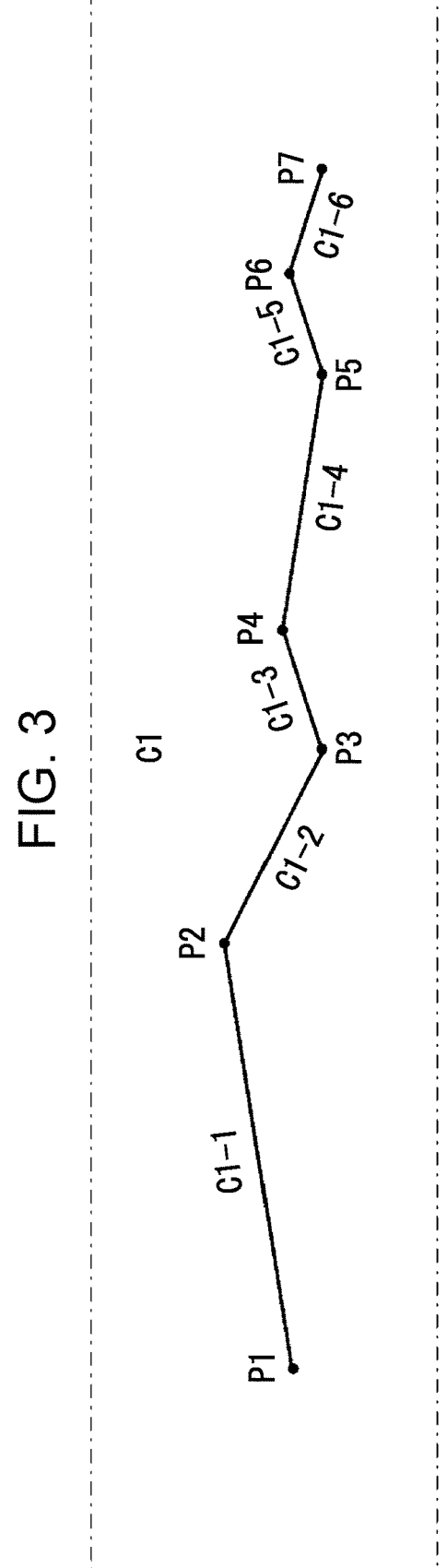
FIG. 3 is a diagram illustrating an example of crack information converted into vector data.

FIG. 3 is a diagram illustrating an example of crack information converted into vector data.

The conversion into vector data is to determine a line segment defined by a start point and an end point of a crack. The determined line segment is a vector (crack vector) indicating a crack. The crack information converted into vector data includes at least coordinate information of a start point and an end point of a crack vector. In this embodiment, information on crack lengths and widths is further included. The coordinates are set using, for example, one of feature points extracted from an image as the origin.

In the table illustrated in FIG. 3, a group ID (Identification) is information for identifying a crack group. A crack group is a series of crack vectors that can be regarded as one crack. The vector ID is information for identifying each crack vector.

In addition, various other kinds of information can be added to the crack information. Branching cracks may be organized in a hierarchy to record crack information (see, for example, JP2019-200213A).

The crack extraction processing is performed using a known method, for example, a trained model obtained by machine learning.

The information on the image includes image data, acquisition date and time information, image width information, image height information, resolution (pixel resolution) information, and so on. The acquisition date and time information is information on the date and time when the information on the image was acquired. The image width information and the image height information are recorded as information on the numbers of pixels in the width direction and the height direction of the image. The unit of resolution is mm/pixel.

The information acquisition unit 21 acquires crack information (damage information) to be processed and information on an image from which the crack information is extracted. As described above, in this embodiment, a difference between current crack information and previous crack information is calculated. Accordingly, the crack information to be acquired is current crack information and previous crack information, and the information on the image to be acquired is information on current and previous images. The current crack information is an example of first damage information. The previous crack information is an example of second damage information. The image (current image) from which the current crack information is extracted is an example of a first image. The image (previous image) from which the previous crack information is extracted is an example of a second image. The current and previous images are images obtained by capturing images of the inspection-target structure at different time points.

The current crack information and the information on the image (current image) from which the current crack information is extracted are stored in the auxiliary memory device 14 in association with each other. The previous crack information and the information on the image (previous image) from which the previous crack information is extracted are stored in the auxiliary memory device 14 in association with each other. The information acquisition unit 21 reads and acquires current crack information and information on an image (current image) associated with the current crack information from the auxiliary memory device 14. The information acquisition unit 21 further reads and acquires previous crack information and information on an image (previous image) associated with the previous crack information from the auxiliary memory device 14.

The current image and the previous image are images obtained by capturing images of the same surface of the same structure at substantially the same range. Accordingly, pieces of crack information extracted from the respective images are pieces of crack information at substantially the same range of the same structure.

The feature point extraction processing unit 22 individually extracts feature points from the current image and the previous image acquired by the information acquisition unit 21. The extraction of the feature points is performed using a known method such as accelerated KAZE (AKAZE) or oriented FAST and rotated BRIEF (ORB). A plurality of feature points are extracted from each image.

The correspondence point search processing unit 23 performs a process (so-called matching process) of searching for corresponding feature points (correspondence points) between the current image and the previous image from which the feature points are extracted. This process is performed using a known method such as brute force or fast library for approximate nearest neighbors (FLANN).

Figure 4:
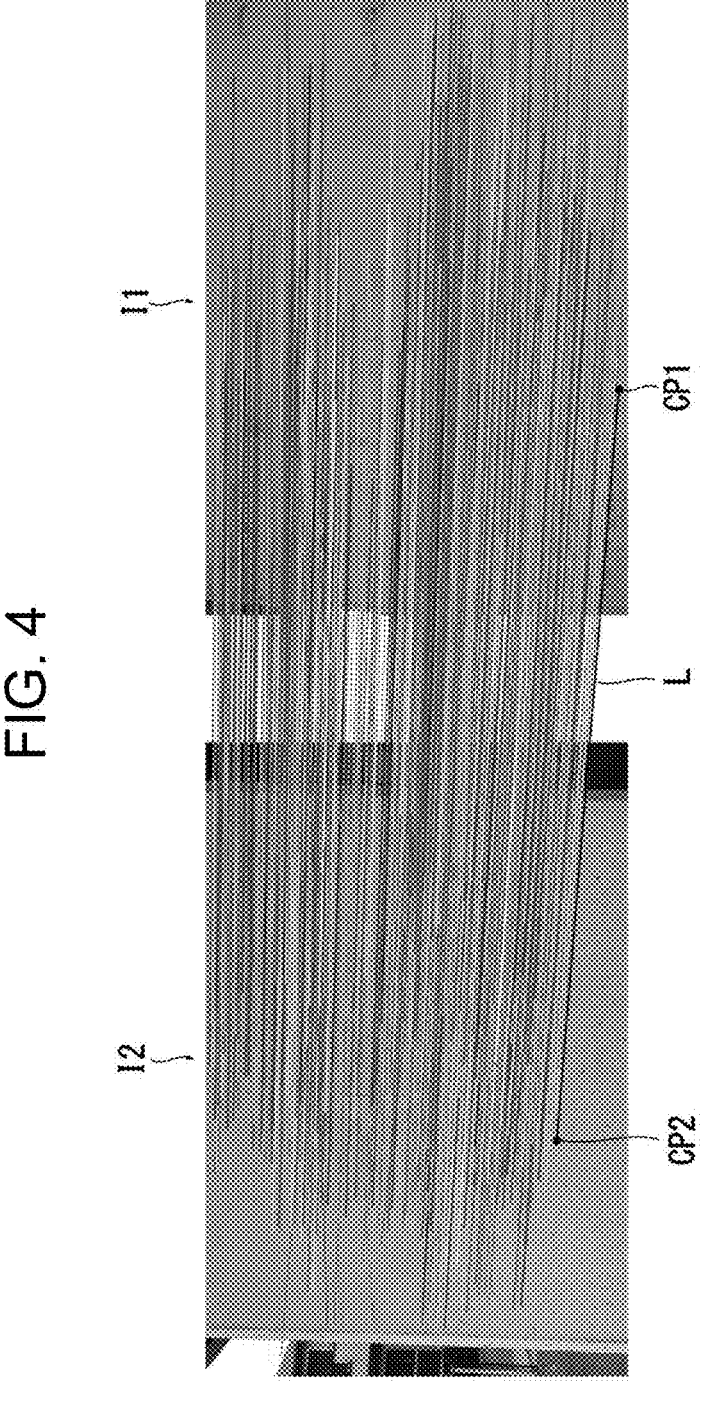
FIG. 4 is a diagram visually illustrating a search result for correspondence points.

FIG. 4 is a diagram visually illustrating a search result for correspondence points. In FIG. 4, corresponding feature points between a current image I1 and a previous image I2 are represented by being connected by straight lines. For example, in FIG. 4, a feature point CP1 extracted from the current image I1 corresponds to a feature point CP2 extracted from the previous image I2, and both are connected by a straight line L.

The registration processing unit 24 performs registration between the current crack information and the previous crack information on the basis of information on the corresponding feature points between the current image and the previous image.

Figure 5:
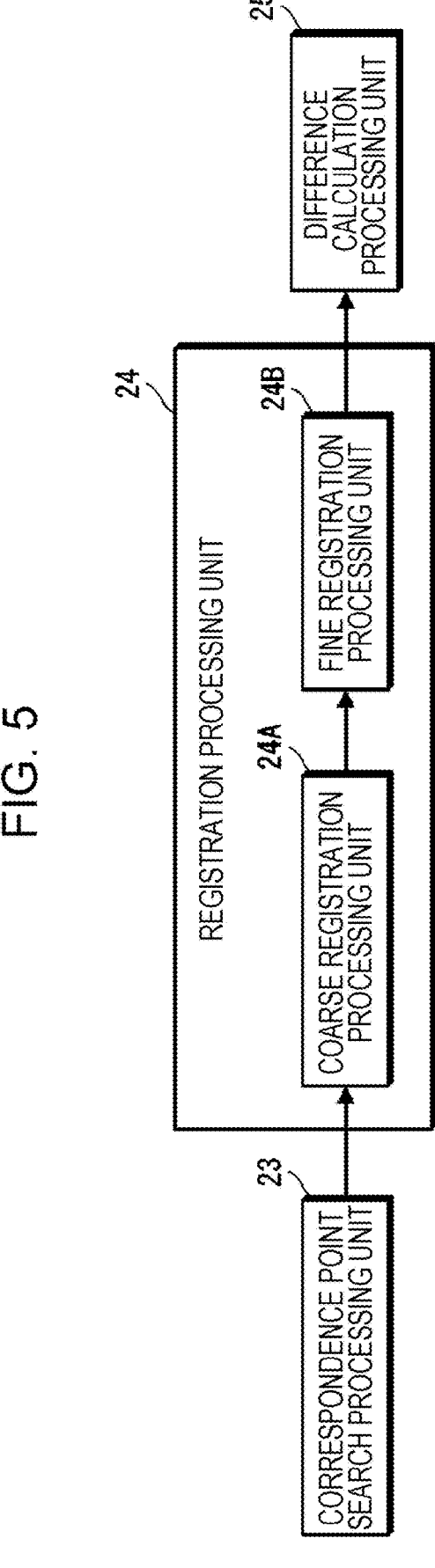
FIG. 5 is a block diagram of functions of a registration processing unit.

FIG. 5 is a block diagram of functions of the registration processing unit 24.

As illustrated in FIG. 5, the registration processing unit 24 has the functions of a coarse registration processing unit 24A and a fine registration processing unit 24B.

The coarse registration processing unit 24A performs, as preceding processing, coarse registration between the current crack information and the previous crack information. That is, rough registration is performed. The coarse registration processing unit 24A performs coarse registration between the current crack information and the previous crack information on the basis of information on the correspondence points found by the correspondence point search processing unit 23 (information on the corresponding feature points between the current image and the previous image). In this embodiment, known rigid registration processing is performed to perform coarse registration processing. Examples of the rigid registration processing include processing such as affine transformation and projection transformation. The coarse registration processing unit 24A constructs a rigid deformation model on the basis of information on the correspondence points found by the correspondence point search processing unit 23. That is, a rigid deformation model for reducing a shift between correspondence points is constructed. The coarse registration processing unit 24A applies the constructed rigid deformation model to the current crack information or the previous crack information to perform coarse registration (rigid registration) between the current crack information and the previous crack information. In this embodiment, the rigid deformation model is applied to the previous crack information to perform coarse registration. Accordingly, as the rigid deformation model, a model is constructed, which is registered with the current crack information when applied to the previous crack information.

The fine registration processing unit 24B performs, as subsequent processing, fine registration between the current crack information and the previous crack information after the coarse registration processing. That is, detailed registration is performed. The fine registration processing unit 24B performs fine registration between the current crack information and the previous crack information after the coarse registration processing, on the basis of the information on the correspondence points after the coarse registration processing. In this embodiment, known non-rigid registration processing is performed to perform fine registration processing. Examples of the non-rigid registration processing include processing using a thin-plate spline (TPS) method, processing using a coherent point drift (CPD) method, and processing using a free-form deformation (FFD) method. The fine registration processing unit 24B constructs a non-rigid deformation model on the basis of information on the correspondence points after the coarse registration processing. That is, a non-rigid deformation model for reducing a shift between correspondence points is constructed. The fine registration processing unit 24B applies the constructed non-rigid deformation model to the current crack information or the previous crack information after the coarse registration processing to perform fine registration (non-rigid registration) between the current crack information and the previous crack information after the coarse registration processing. In this embodiment, the non-rigid deformation model is applied to the previous crack information after the coarse registration processing to perform fine registration. Accordingly, as the non-rigid deformation model, a model is constructed, which is registered with the current crack information after the coarse registration processing when applied to the previous crack information after the coarse registration processing.

As described above, the registration processing unit 24 performs coarse registration followed by fine registration to achieve registration between the current crack information and the previous crack information. This enables accurate registration between the current crack information and the previous crack information. That is, while a method of performing only rigid registration may cause a position shift, non-rigid registration performed thereafter makes it possible to correct the shift caused by insufficient alignment during rigid registration, implementing accurate registration. In a case where only non-rigid registration is performed, unreasonable deformation may be applied. Rigid registration performed in advance can suppress such unreasonable deformation, and accurate registration can be implemented as a whole.

The difference calculation processing unit 25 calculates a difference between the current crack information and the previous crack information after the registration processing.

Figure 6:
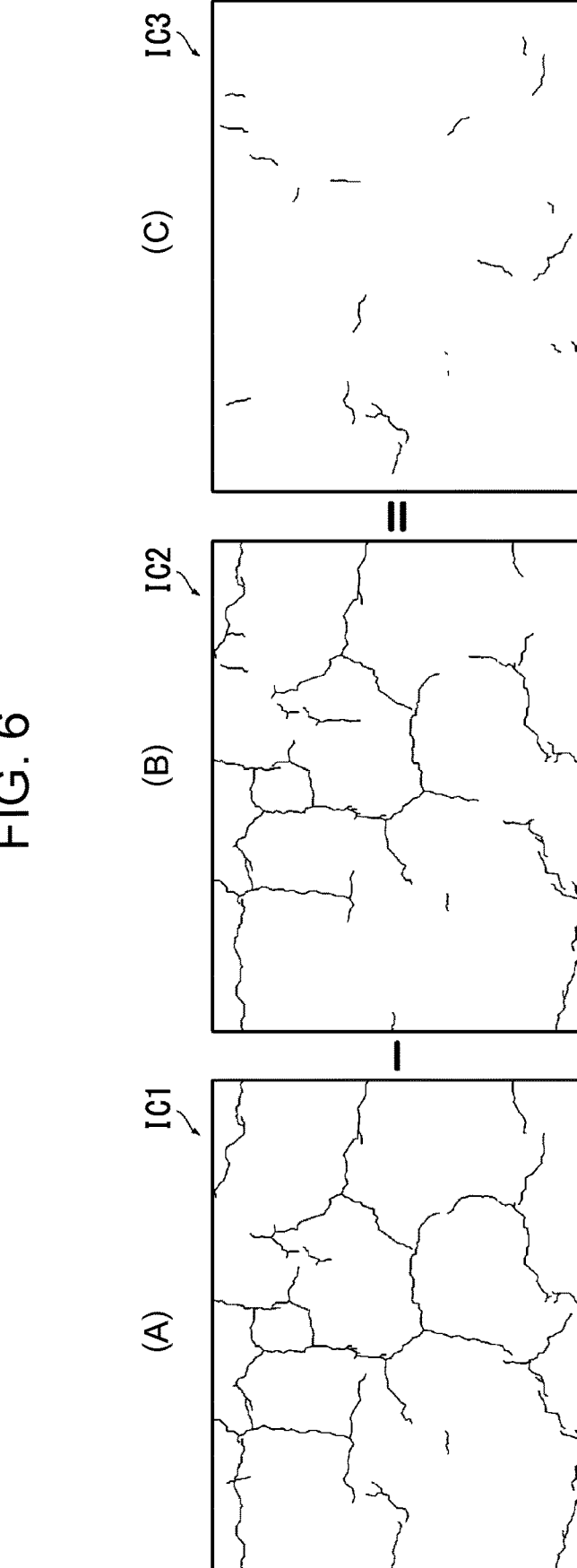
FIG. 6 is a conceptual diagram of calculation of a difference in crack length.

FIG. 6 is a conceptual diagram of calculation of a difference in crack length.

Part (A) of FIG. 6 illustrates current crack information IC1 extracted from the current image. Part (B) of FIG. 6 illustrates previous crack information IC2 extracted from the previous image. Part (C) of FIG. 6 illustrates difference calculation result information IC3.

As illustrated in FIG. 6, the difference between the current crack information IC1 and the previous crack information IC2 is calculated as the crack length difference information IC3. That is, a crack found only in either image is extracted, and the length of the extracted crack is calculated as a difference. More specifically, a difference in crack length is calculated in the following procedure.

FIG. 7 is a block diagram of functions of the difference calculation processing unit 25.

As illustrated in FIG. 7, the difference calculation processing unit 25 has the functions of a pairing processing unit 25A, a first difference calculation unit 25B, and a second difference calculation unit 25C.

The pairing processing unit 25A acquires the current crack information and the previous crack information after the registration processing and generates a pair of corresponding cracks. As described above, the crack information is converted into vector data and recorded as vector information. The pairing processing unit 25A generates a pair of adjacent crack vectors (pairing).

Figure 8:
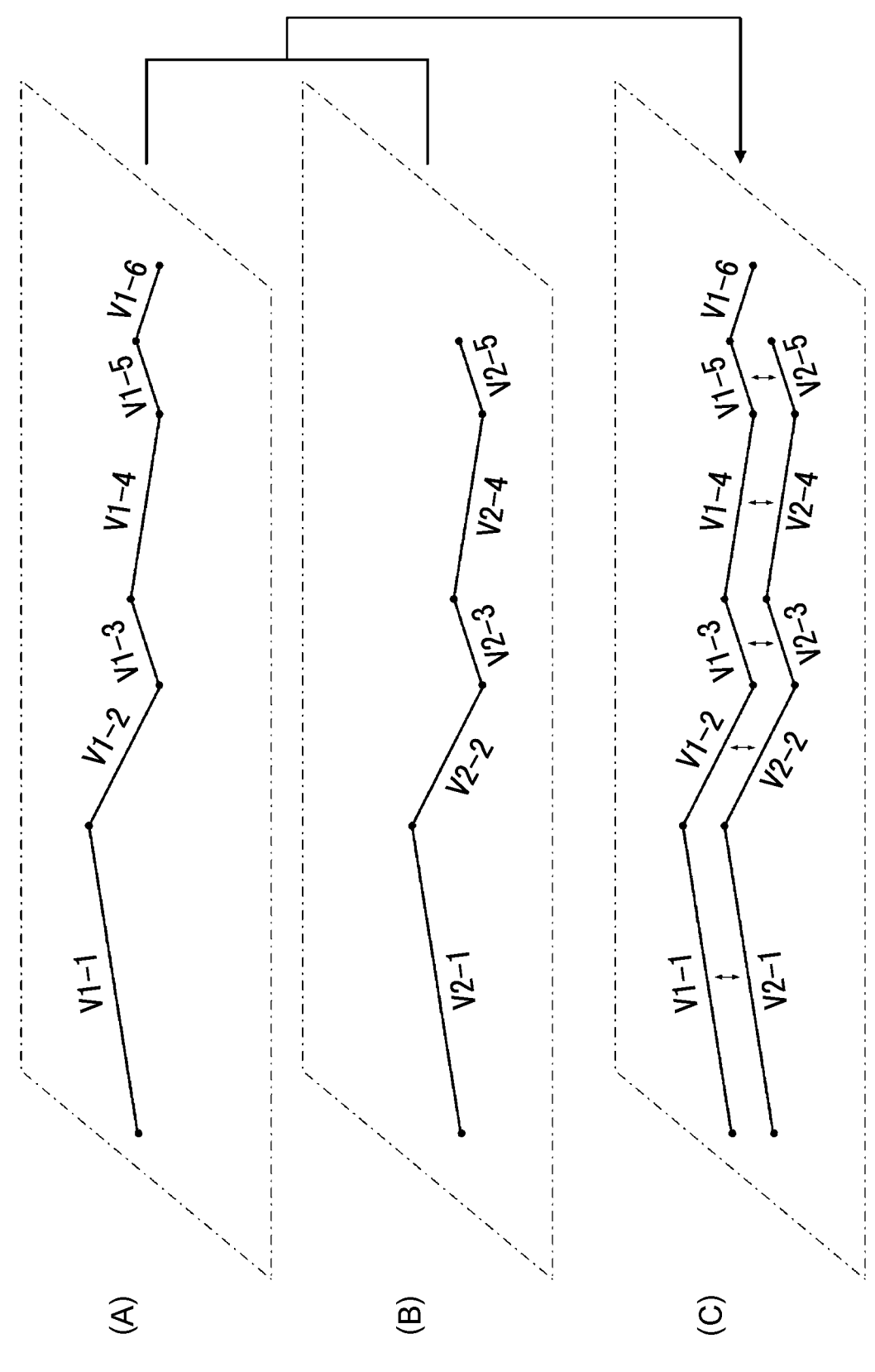
FIG. 8 is a conceptual diagram of generation of crack pairs.

FIG. 8 is a conceptual diagram of generation of crack pairs.

Part (A) of FIG. 8 illustrates a portion of the current crack information in an overhead view, and part (B) of FIG. 8 illustrates a portion of the previous crack information in an overhead view. Part (C) of FIG. 8 is realized by overlaying parts (A) and (B) of FIG. 8 on top of one another.

The registration processing enables registration of corresponding cracks. However, it is difficult to completely align the positions of all the cracks. In addition, the crack extraction results themselves may include a shift. Accordingly, in this embodiment, a pair of corresponding cracks are generated, and the cracks in the generated pair are compared to calculate a difference.

A pair of adjacent crack vectors is generated when the current crack information and the previous crack information are overlaid on top of one another. That is, when the current crack information and the previous crack information are overlaid on top of one another, a pair of crack vectors located closest to each other is generated.

For example, in the example illustrated in FIG. 8, focus is given to a crack vector V1-1 in the current crack information, to which the closest previous crack vector is a crack vector V2-1, as illustrated in part (C) of FIG. 8. Accordingly, the crack vector V1-1 and the crack vector V2-1 are combined into a pair. In the example illustrated in FIG. 8, furthermore, a current crack vector V1-2 and a previous crack vector V2-2 are combined into a pair. Further, a current crack vector V1-3 and a previous crack vector V2-3 are combined into a pair. Further, a current crack vector V1-4 and a previous crack vector V2-4 are combined into a pair. Further, a current crack vector V1-5 and a previous crack vector V2-5 are combined into a pair. In part (C) of FIG. 8, an arrow indicates the correspondence relationship between a current crack vector and a previous crack vector.

In the example illustrated in FIG. 8, by contrast, no previous crack vector corresponds to a current crack vector V1-6. In this case, the current crack vector V1-6 is a crack vector that is not paired (an unpaired crack vector). A crack vector that is not paired corresponds to a newly generated crack (a grown crack).

The first difference calculation unit 25B calculates a difference in crack length as a difference in crack information. The first difference calculation unit 25B calculates a difference in crack length on the basis of the current crack information and the previous crack information from which a pair of crack vectors is generated. Specifically, the length of a crack vector that is not paired is calculated to calculate a difference in crack length. When the crack information has information on lengths of crack vectors, lengths are determined to have been calculated, and information on the lengths is acquired. In the example illustrated in FIG. 8, the current crack vector V1-6 is a crack vector that is not paired. Accordingly, the length of the current crack vector V1-6 is calculated to calculate a difference in crack length.

The second difference calculation unit 25C calculates a difference in crack width as a difference in crack information. The second difference calculation unit 25C calculates a difference in crack width on the basis of the current crack information and the previous crack information from which a pair of crack vectors is generated. Specifically, a difference in width between a pair of crack vectors is calculated. For example, in the example illustrated in FIG. 8, the difference in width between the pair of the current crack vector V1-1 and the previous crack vector V2-1 is calculated by "(the width of the current crack vector V1-1)–(the width of the previous crack vector V2-1)". It is assumed that the current crack vector V1-1 has a width of 0.1 mm and the previous crack vector V2-1 paired therewith has a width of 0.05 mm. In this case, 0.1 mm–0.05 mm=0.05 mm is calculated as the difference in width between the pair.

The calculation result output processing unit 26 outputs a difference calculation result to the output device 16 in a predetermined format. In the information processing apparatus 10 according to this embodiment, the output device 16 is constituted by a display. Accordingly, the calculation result output processing unit 26 displays the difference calculation result on the display, which is a display destination.

Figure 9:
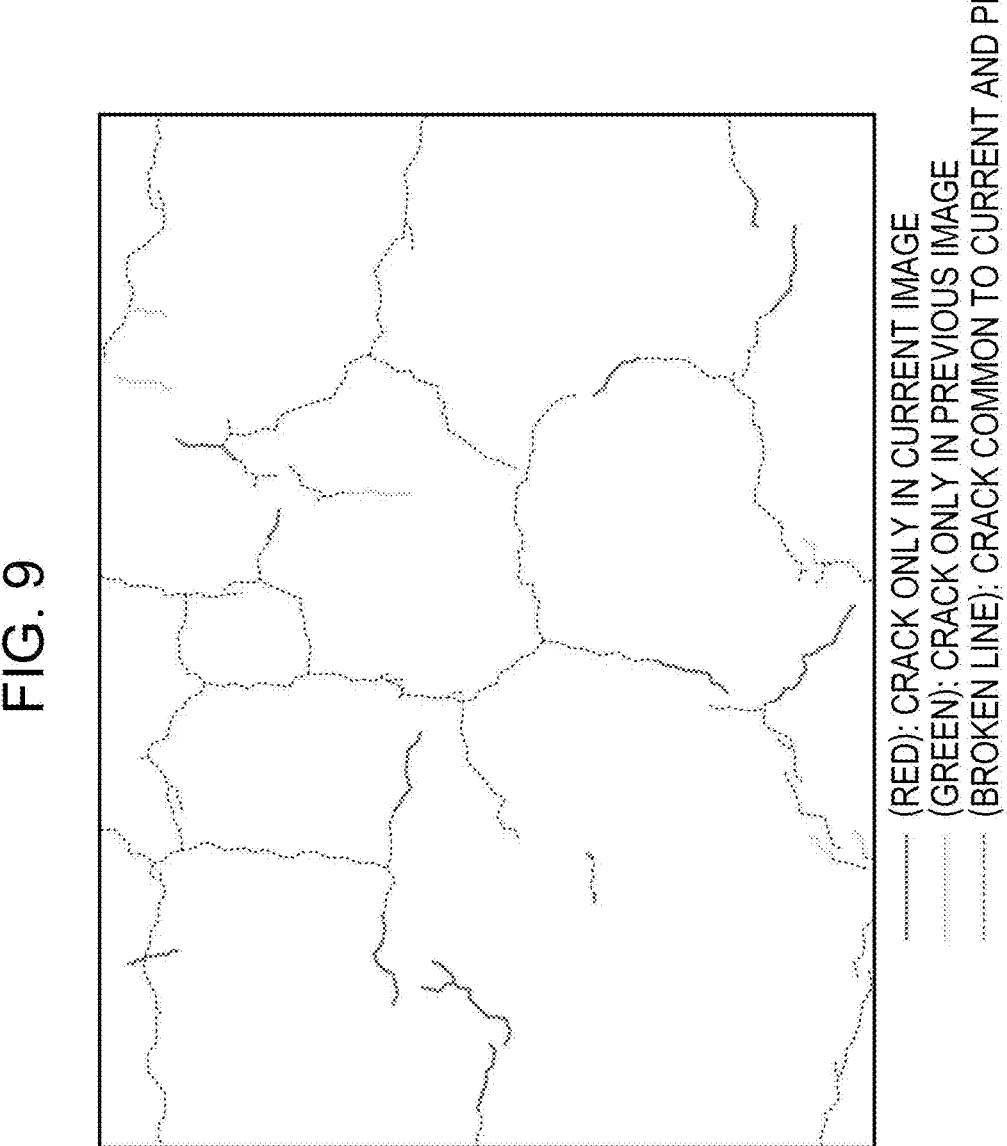
FIG. 9 is a diagram illustrating an example of the display of a result of calculating differences in crack length.

FIG. 9 is a diagram illustrating an example of the display of a result of calculating differences in crack length.

As illustrated in FIG. 9, an image in which cracks extracted from both the current and previous images are represented by lines of a different color or by lines of a different type is displayed as a result of calculating differences in crack length. In the example illustrated in FIG. 9, cracks extracted only from the current image are represented by red solid lines, cracks extracted only from the previous image are represented by green solid lines, and common cracks extracted from both images are represented by broken lines (black). The calculation result output processing unit 26 generates an image in which cracks are separately displayed by lines of different colors or by lines of different types in the manner described above, and outputs the image to the output device 16.

The "cracks extracted only from the current image" are cracks not found in the past. Accordingly, the cracks are considered to be cracks that grow (extend) or are newly generated.

By contrast, the "cracks extracted only from the previous image" are cracks found in the past but absent at present. Outputting of such cracks as a difference calculation result is considered to be unnatural unless repair or the like is made. Accordingly, it is preferable to adopt a configuration in which cracks extracted only from the previous image are displayed in a highlighted manner to bring attention to the cracks. For example, it is possible to adopt a configuration in which such cracks are displayed in a color or a line type that is visually more noticeable than others to bring attention to the cracks. It is also possible to adopt a configuration in which a warning display is provided to bring attention.

Calculation of an unnatural difference (a difference against irreversible changes in damage) may be caused by defective imaging, defective damage extraction processing, or the like.

The image representing a difference calculation result may be displayed superimposed on the current or previous image from which the cracks are extracted, as necessary.

FIGS. 10A to 10F are diagrams illustrating another example of the display of a result of calculating differences in crack length. FIGS. 10A to 10F illustrate an example of switching of display in accordance with an instruction from a user.

Figure 10:
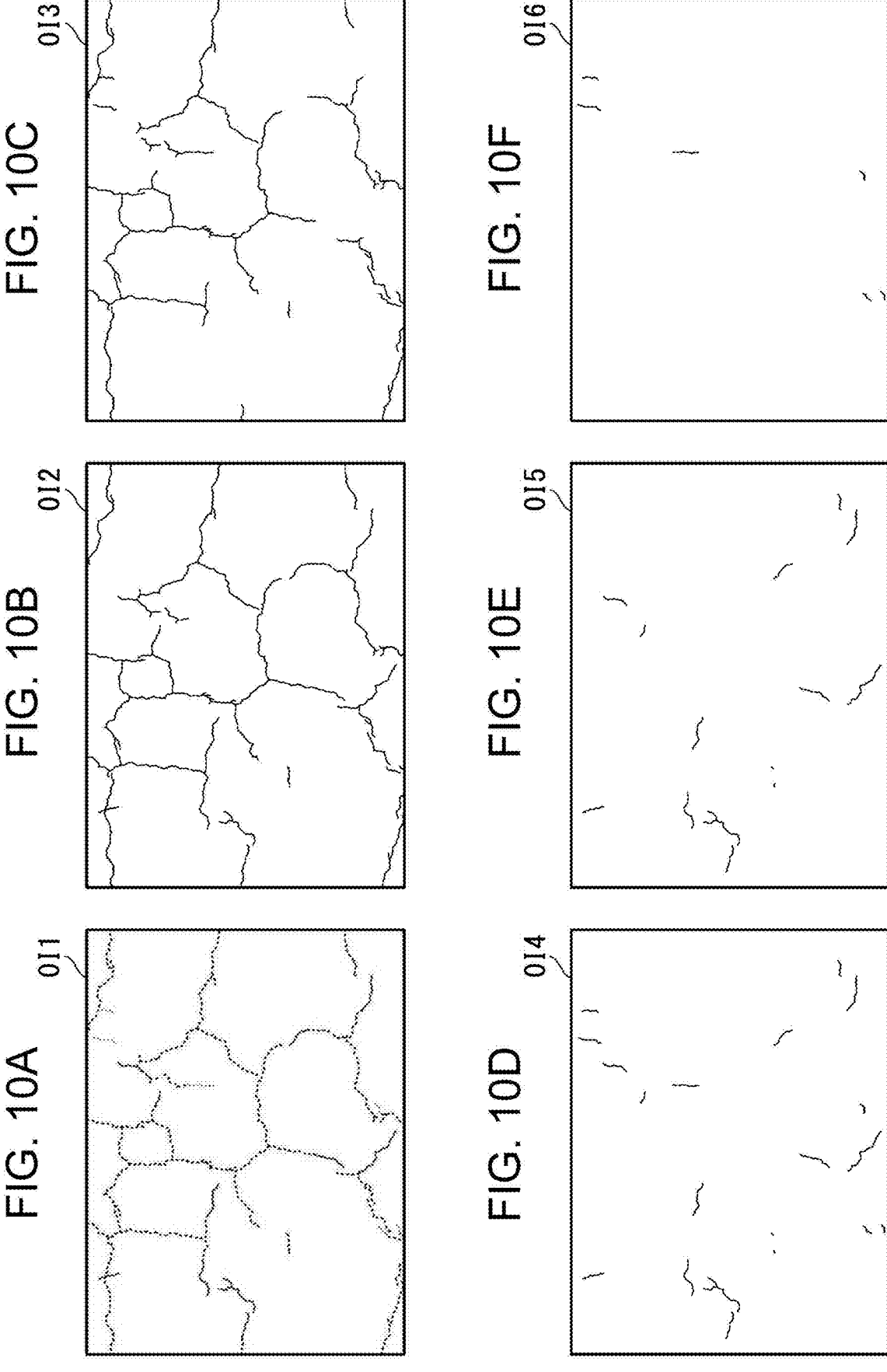
FIGS. 10A to 10F are diagrams illustrating another example of the display of a result of calculating differences in crack length.

FIG. 10A illustrates an example of the display of an image OI1 in which the cracks extracted from both the current and previous images are represented by lines of a different color or by lines of a different type. The image OI1 is the same as the image illustrated in FIG. 9.

FIG. 10B illustrates an example of the display of an image OI2 in which the cracks extracted from the current image are represented by lines. The image OI2 corresponds to a current damage diagram obtained by tracing the current cracks from the current image.

FIG. 10C illustrates an example of the display of an image OI3 in which the cracks extracted from the previous image are represented by lines. The image OI3 corresponds to a previous damage diagram obtained by tracing the previous cracks from the previous image.

FIG. 10D illustrates an example of the display of an image OI4 in which only the differences are represented by lines.

FIG. 10E illustrates an example of the display of an image OI5 in which cracks extracted only from the current image among the differences are represented by lines. That is, an example of the display of an image in which only cracks not found in the past are represented by lines is illustrated.

FIG. 10F illustrates an example of the display of an image OI6 in which cracks extracted only from the previous image among the differences are represented by lines. That is, an example of the display of an image in which only cracks not found at present are represented by lines is illustrated.

The calculation result output processing unit 26 switches these images in accordance with an instruction from the user and outputs the images to the output device 16. These images may be displayed superimposed on the current or previous image from which the cracks are extracted, as necessary.

Figure 11:
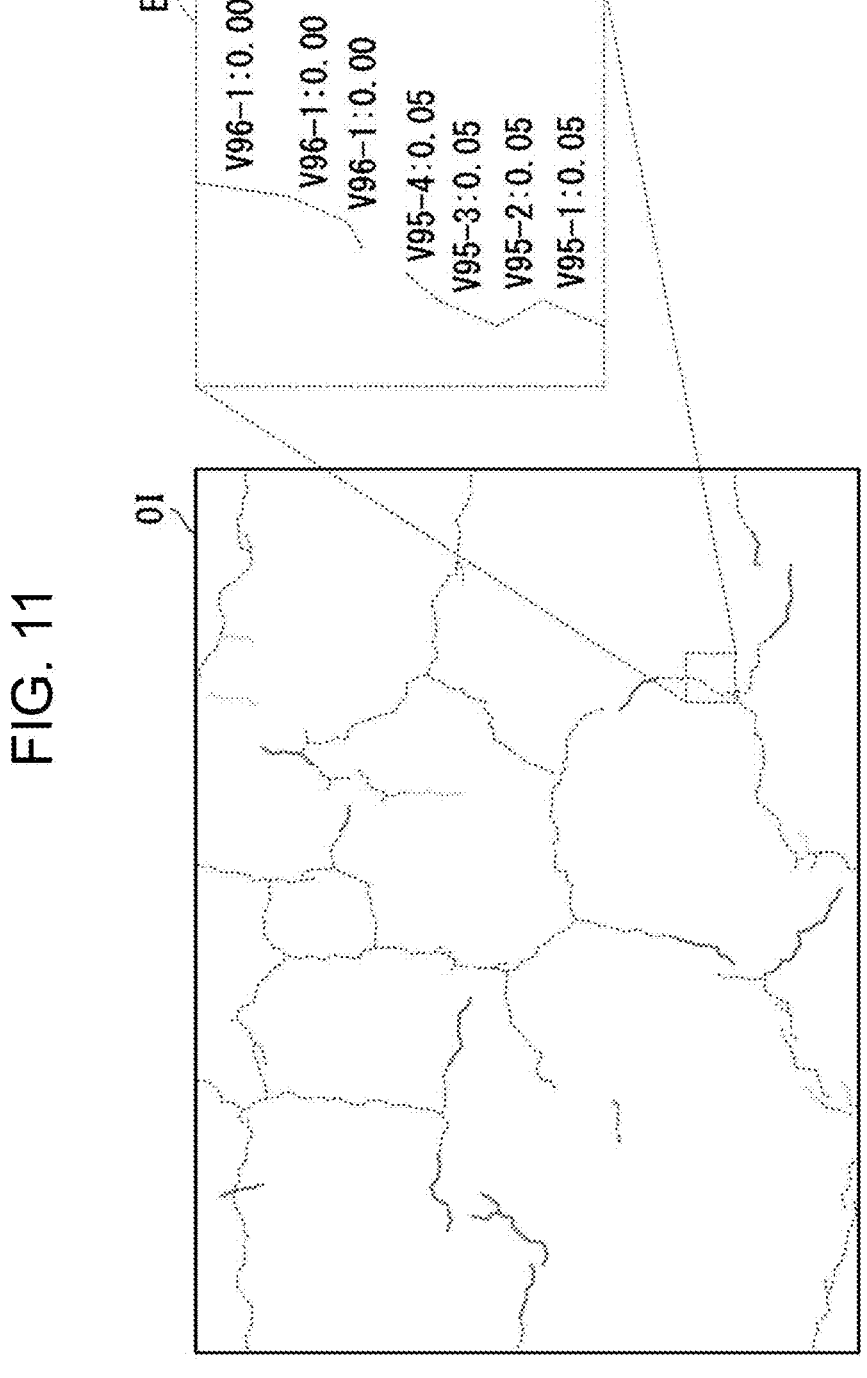
FIG. 11 is a diagram illustrating an example of the display of a result of calculating differences in crack width.

FIG. 11 is a diagram illustrating an example of the display of a result of calculating differences in crack width. FIG. 11 illustrates an image OI, which is displayed as a calculation result, and an image EI, which is obtained by enlarging a portion of the image OI.

In the example illustrated in FIG. 11, an example is illustrated in which a result of calculating differences in crack width is displayed in addition to the result of calculating differences in crack length.

As illustrated in FIG. 11, as the result of calculating differences in length, cracks extracted from both the current and previous images are represented by lines of a different color or by lines of a different type. In addition, the result of calculating differences in width is displayed in the vicinity of lines (crack vectors) indicating the respective cracks. In the example illustrated in FIG. 11, difference calculation results are displayed together with the vector IDs of the respective cracks (crack vectors).

The difference calculation results may be displayed superimposed on the current or previous image from which the cracks are extracted, as necessary.

An unnatural difference in width, that is, a portion where the current width having a smaller value than the previous width is output, is also preferably displayed in a highlighted manner or the like to alert the user. Such a portion may be displayed in a manner that is more noticeable than the others such that the portion is displayed with a marker or the like or displayed in a different color, for example.

The calculation result recording processing unit 27 records difference calculation result information in the auxiliary memory device 14. The calculation result recording processing unit 27 records the calculation result information in the auxiliary memory device 14 in association with the current crack information and the previous crack information between which the differences are calculated.

Procedure of Difference Calculation Process (Information Processing Method)

Figure 12:
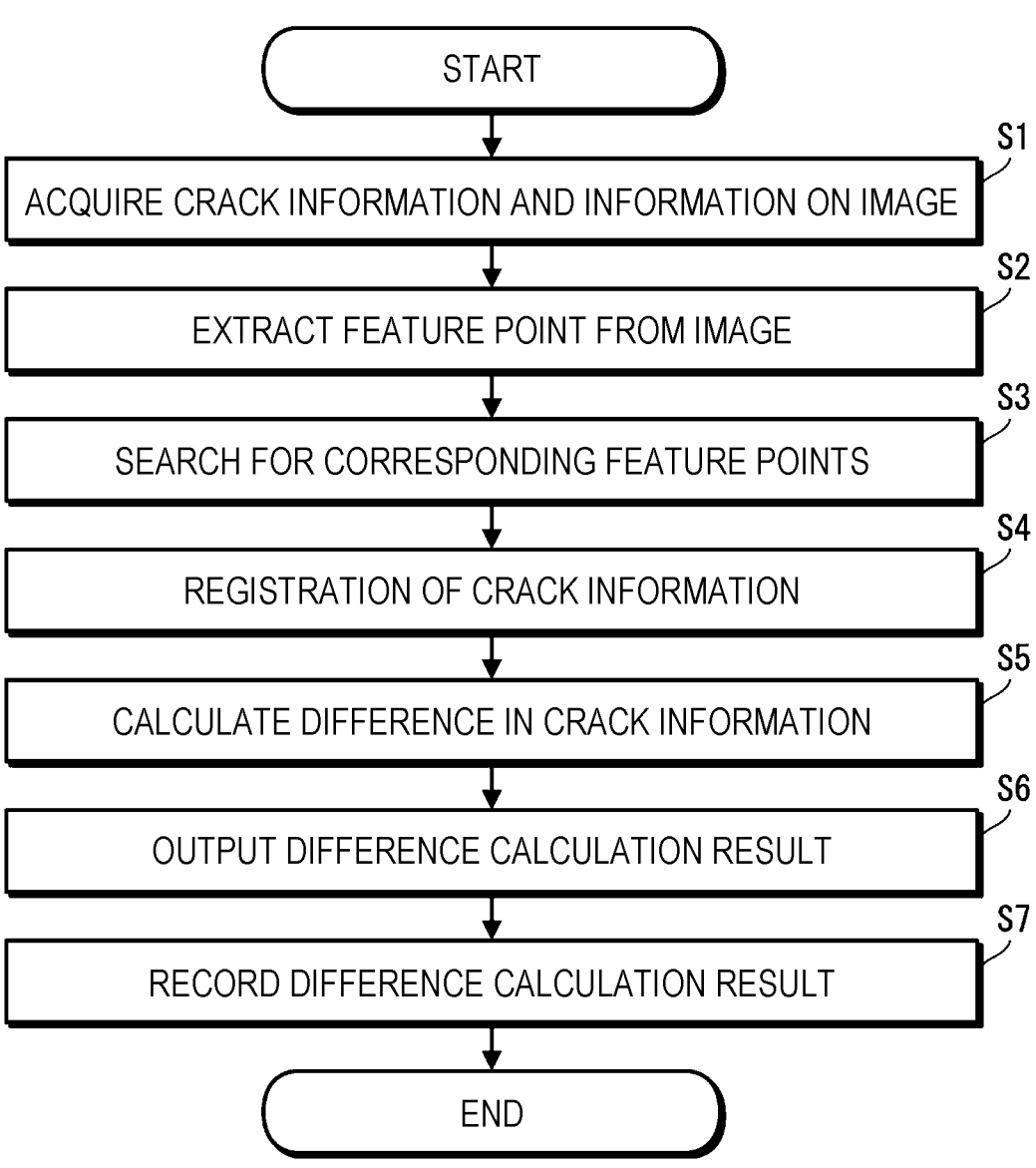
FIG. 12 is a flowchart illustrating a procedure of a process for calculating a difference in damage information (crack information)

FIG. 12 is a flowchart illustrating a procedure of a process for calculating a difference in damage information (crack information), which is performed by the information processing apparatus according to this embodiment.

First, a process of acquiring crack information to be processed and information on an image from which the crack information is extracted is performed (step S1). In this embodiment, a difference between current crack information and previous crack information is calculated. Accordingly, the current crack information, the previous crack information, and information on the current and previous images from which the current crack information and the previous crack information are extracted are acquired. In this embodiment, these pieces of information are read and acquired from the auxiliary memory device 14.

Then, a process of individually extracting feature points from the acquired current and previous images is performed (step S2). A plurality of feature points are extracted from each image.

Then, a process of searching for corresponding feature points (correspondence points) between the current and previous images is performed (step S3).

Then, a process of performing registration between the current crack information and the previous crack information on the basis of information on the corresponding feature points is performed (step S4).

Figure 13:
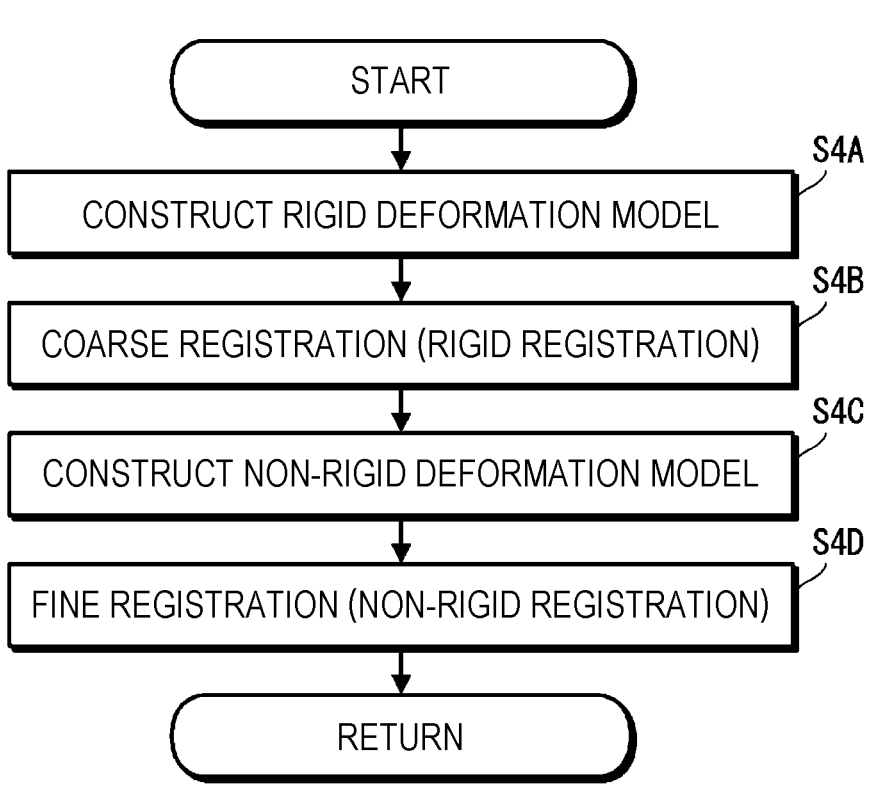
FIG. 13 is a flowchart illustrating a procedure of a registration process.

FIG. 13 is a flowchart illustrating a procedure of a registration process.

First, a rigid deformation model is constructed on the basis of the information on the corresponding feature points (step S4A).

Then, the constructed rigid deformation model is used to perform coarse registration (rigid registration) between the current crack information and the previous crack information (step S4B). In this embodiment, the constructed rigid deformation model is applied to the previous crack information to perform coarse registration.

Then, a non-rigid deformation model is constructed on the basis of the information on the correspondence points after the coarse registration processing (step S4C).

Then, the constructed non-rigid deformation model is used to perform fine registration (non-rigid registration) between the current crack information and the previous crack information after the coarse registration processing (step S4D). In this embodiment, the constructed non-rigid deformation model is applied to the previous crack information after the coarse registration processing to perform fine registration.

Then, the registration process is completed.

Then, as illustrated in FIG. 12, a process of calculating a difference between the current crack information and the previous crack information after the registration process is performed (step S5).

Figure 14:
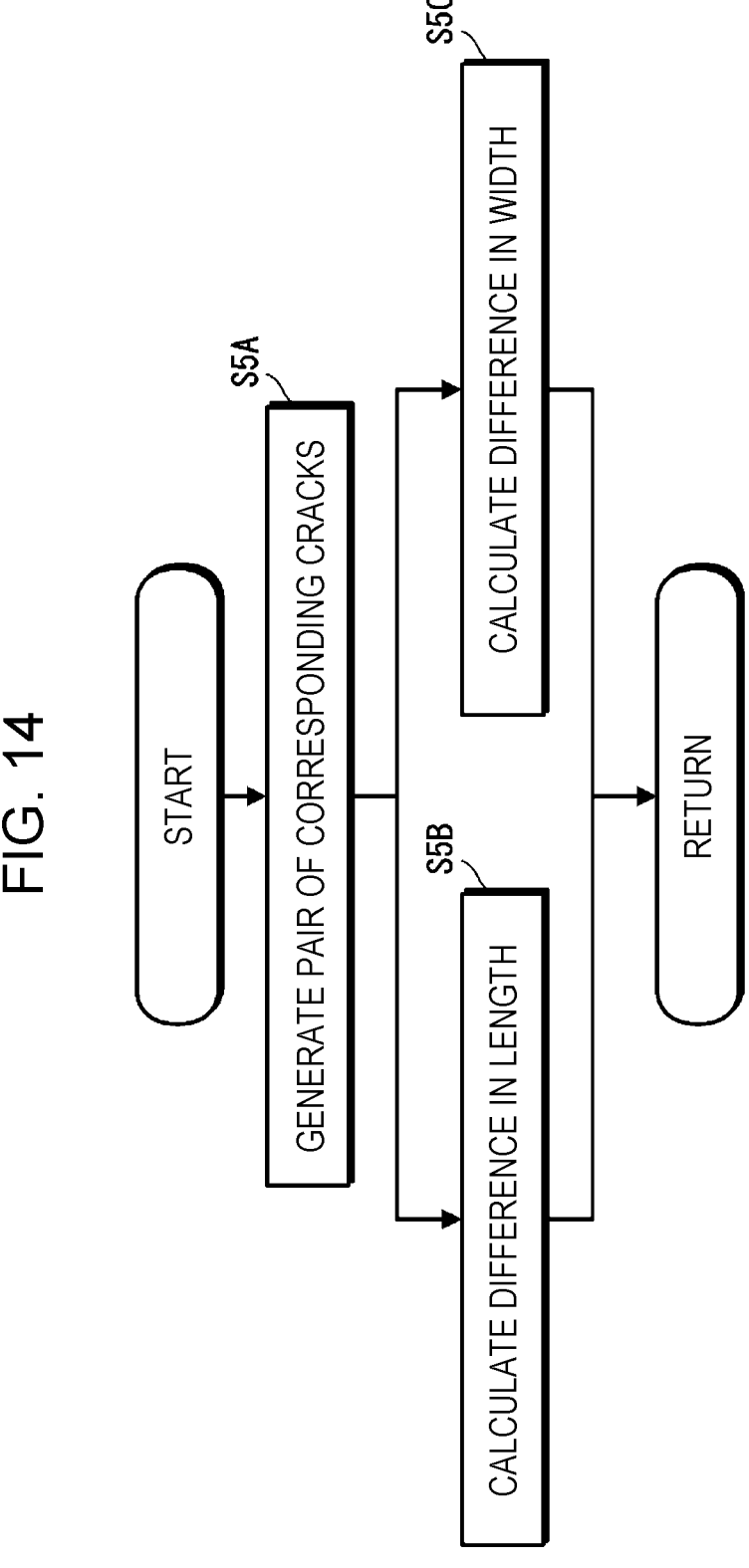
FIG. 14 is a flowchart illustrating a procedure of a difference calculation process.

FIG. 14 is a flowchart illustrating a procedure of a difference calculation process.

First, a process of generating a pair of corresponding cracks between the current crack information and the previous crack information after the registration process is performed (step S5A). In this embodiment, a pair of adjacent crack vectors is generated.

Then, a difference in crack length is calculated on the basis of the current crack information and the previous crack information between which the pair of crack vectors is generated (step S5B). Specifically, the length of a crack vector that is not paired is calculated to calculate a difference in crack length.

Further, a difference in crack width is calculated on the basis of the current crack information and the previous crack information between which the pair of crack vectors is generated (step S5C). Specifically, a difference in width between a pair of crack vectors is calculated.

Then, the difference calculation process is completed. When the difference calculation process is completed, the calculation result is output to the output device 16 (step S6).

Further, the calculation result is recorded in the auxiliary memory device 14 (step S7). The calculation result is recorded in association with crack information for which the difference is calculated.

As described above, the information processing apparatus according to this embodiment can accurately calculate a difference for each crack by performing registration. In particular, as a registration process, performing coarse registration followed by fine registration enables accurate registration. As a result, the subsequent difference calculation process can be performed with high accuracy.

Difference Calculation Method for Other Damage

In a case where damage information is converted into vector data and recorded as vector information, the information processing apparatus described in the embodiment described above can calculate a difference in the damage information. For example, a difference in chalk information or the like can be calculated by the information processing apparatus described in the embodiment described above.

Examples of the damage appearing on the surfaces of the structure include peeling, exposure of reinforcing bars, water leakage (including rust fluid), free lime, and corrosion, as well as the cracks described above. These pieces of information, namely, damage information, are recorded as region information.

In a case where the damage information is constituted by region information (damaged-region information), the difference calculation processing unit 25 calculates a difference in the damage information in the following way.

Figure 15:
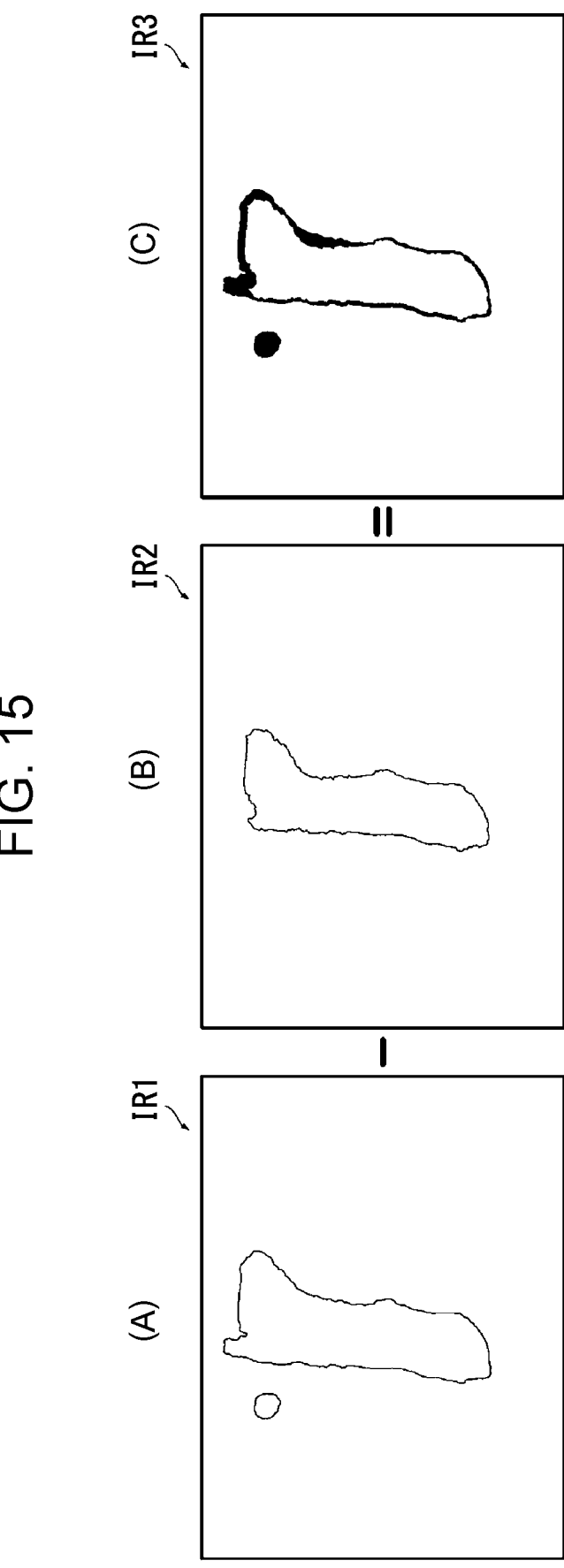
FIG. 15 is a conceptual diagram illustrating difference calculation in a case where damage information is constituted by region information.

FIG. 15 is a conceptual diagram of difference calculation in a case where damage information is constituted by region information.

FIG. 15 illustrates an example of a case where a region in which free lime is present is extracted as a damaged region from a captured image of a structure.

Part (A) of FIG. 15 illustrates information IR1 on a current free-lime-generated region (damaged region) extracted from the current image. Part (B) of FIG. 15 illustrates information IR2 on a previous free-lime-generated region (damaged region) extracted from the previous image. The information on the free-lime-generated region extracted from the current image is an example of first damage information. The information on the free-lime-generated region extracted from the previous image is an example of second damage information. Part (C) of FIG. 15 illustrates difference calculation result information IR3.

As illustrated in FIG. 15, in a case where the damage information is constituted by region information, the difference calculation processing unit 25 calculates (extracts) a difference region between corresponding damaged regions. Further, the area of the difference region is calculated. In the example illustrated in part (C) of FIG. 15, regions calculated as differences are filled in black.

When output, a difference calculation result is preferably displayed by a different color and/or a different line type in a manner similar to that for cracks. A portion where an unnatural difference against irreversible changes in damage is output, for example, a portion where the current damage is smaller than the previous one, is preferably highlighted to alert the user.

Modifications of Pairing Process

As described in the embodiment described above, in a case where the damage information is crack information converted into vector data, a pair of corresponding cracks is generated, and a difference is calculated. As a result, a difference can be easily and accurately calculated. The embodiment described above provides a configuration for generating a pair of adjacent cracks. However, the method for generating a pair of corresponding cracks is not limited to this. Any other method, for example, a dynamic programming based matching method (DP matching) may be used to perform a process of generating a pair of corresponding cracks. DP matching is a pattern matching method for one-dimensional data and is a technique used for matching in signal processing. This technique is used for matching vectors, that is, matching crack vectors, to generate a pair of corresponding cracks.

Modifications of Information Acquisition Unit

The embodiment described above provides a configuration in which current damage information and previous damage information are acquired from the auxiliary memory device 14. However, the information processing apparatus 10 may have a damage extraction function and may be configured to directly acquire an extraction result. In this case, the extraction process may be performed only on the current damage, and the previous damage information may be read and acquired from the auxiliary memory device 14.

Alternatively, damage information and information on an image from which the damage information is extracted may be acquired from an external device connected via the input/output interface 17. Alternatively, the information may be acquired from an external device connected via a network.

Modifications of Fine Registration Processing Unit

The embodiment described above provides a configuration in which non-rigid registration processing is performed as fine registration processing. However, the fine registration processing is not limited to this. For example, lens distortion may also cause a position shift. Accordingly, if lens distortion is different between the two, current and previous images, the difference in lens distortion is corrected to perform fine registration. As a result, the position shift caused by lens distortion can be overcome, and more accurate registration can be achieved. The following describes a method for fine registration by lens distortion correction.

The difference in lens distortion is corrected by the following method. That is, an optimization problem is solved to minimize the shift between correspondence points by fixing one of the images and changing, for the other image, variables of lens distortion and variables of a projective transformation matrix.

A camera can be represented by a model that projects three-dimensional coordinates onto an image plane.

$$\begin{bmatrix} x \\ y \\ z \end{bmatrix} = R \begin{bmatrix} X \\ Y \\ Z \end{bmatrix} + t$$

$$x' = x/z$$

$$y' = y/z$$

$$u = f_x * x' + c_x$$

$$v = f_y * y' + c_y$$

Here, (X, Y, Z) denotes the coordinates of a point in a three-dimensional coordinate system, and (u, v) denotes the coordinates of a point projected onto the image plane. Further, $(c_x, c_y)$ is a principal point (typically, the center of an image). Further, $f_x$ and $f_y$ are the focal lengths expressed in pixels.

Since the lens of an actual camera has distortions in the radial direction and the circumferential direction, the model described above is extended in the following way.

$$\begin{bmatrix} x \\ y \\ z \end{bmatrix} = R \begin{bmatrix} X \\ Y \\ Z \end{bmatrix} + t$$

$$x' = x/z$$

$$y' = y/z$$

$$x'' = x'(1 + k_1 r^2 + k_2 r^4 + k_3 r^6) + 2p_1 x' y' + p_2(r^2 + 2x'^2)$$

$$y'' = y'(1 + k_1 r^2 + k_2 r^4 + k_3 r^6) + p_1(r^2 + 2y'^2) + 2p_2 x' y'$$

$$\text{where } r^2 = x'^2 + y'^2$$

$$u = f_x * x'' + c_x$$

$$v = f_y * y'' + c_y$$

Here, $k_1$, $k_2$, and $k_3$ are distortion coefficients of the lens in the radial direction. Further, $p_1$ and $p_2$ are distortion coefficients of the lens in the circumferential direction.

Accordingly, lens distortion is represented by the equation below using $k_1$, $k_2$, $k_3$, $p_1$, and $p_2$ as variables.

$$x'' = x'(1 + k_1 r^2 + k_2 r^4 + k_3 r^6) + 2p_1 x' y' + p_2(r^2 + 2x'^2)$$

$$y'' = y'(1 + k_1 r^2 + k_2 r^4 + k_3 r^6) + p_1(r^2 + 2y'^2) + 2p_2 x' y'$$

$$\text{where } r^2 = x'^2 + y'^2$$

$$u = f_x * x'' + c_x$$

$$v = f_y * y'' + c_y$$

The projective transformation matrix is represented by the following expression.

$$\begin{bmatrix} a_{00} & a_{01} & a_{02} \\ a_{10} & a_{11} & a_{12} \\ a_{20} & a_{21} & a_{22} \end{bmatrix}$$

The difference in lens distortion is corrected by optimizing the variables of the lens distortion and the variables of the projective transformation matrix so as to minimize the shift between correspondence points.

Figure 17:
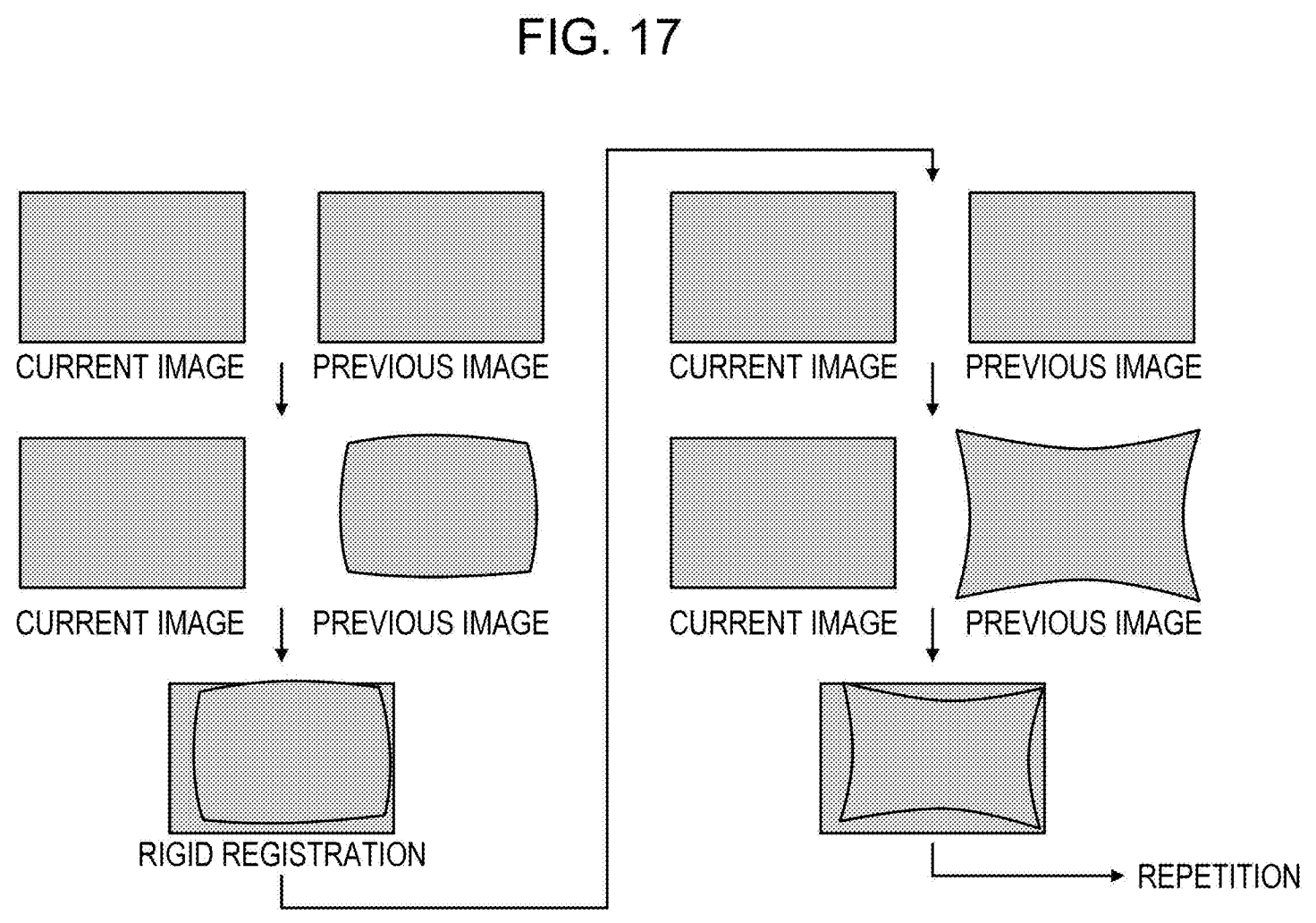

FIG. 17 is a conceptual diagram of correction of a difference in lens distortion.

As illustrated in FIG. 17, the optimization problem is solved to minimize the shift between correspondence points by fixing one of the images and changing, for the other image, the variables of the lens distortion and the variables of the projective transformation matrix.

FIG. 17 illustrates an example of a case where the optimization problem is solved to minimize the shift between correspondence points by fixing the current image and changing, for the previous image, the variables of the lens distortion and the variables of the projective transformation matrix.

As described above, if lens distortion is different between two images, the difference in lens distortion is corrected, thereby enabling more accurate registration to be implemented. Therefore, a difference in damage information can be accurately calculated.

Second Embodiment

The automatic extraction of damage from an image requires a high-resolution image to accurately detect fine damage. To obtain a high-resolution image, an inspection area may be divided into a plurality of regions, and images of the regions may be captured. When images of segments of the inspection area are captured, damage is individually extracted from the respective images, and the results are integrated to obtain the entire extraction result. A method of panoramic composition is used as the process of integration.

This embodiment describes a method for calculating a difference in damage information in a case where images of segments of an inspection area are captured at present and in the past.

Captured Images of Segments

Figure 16:
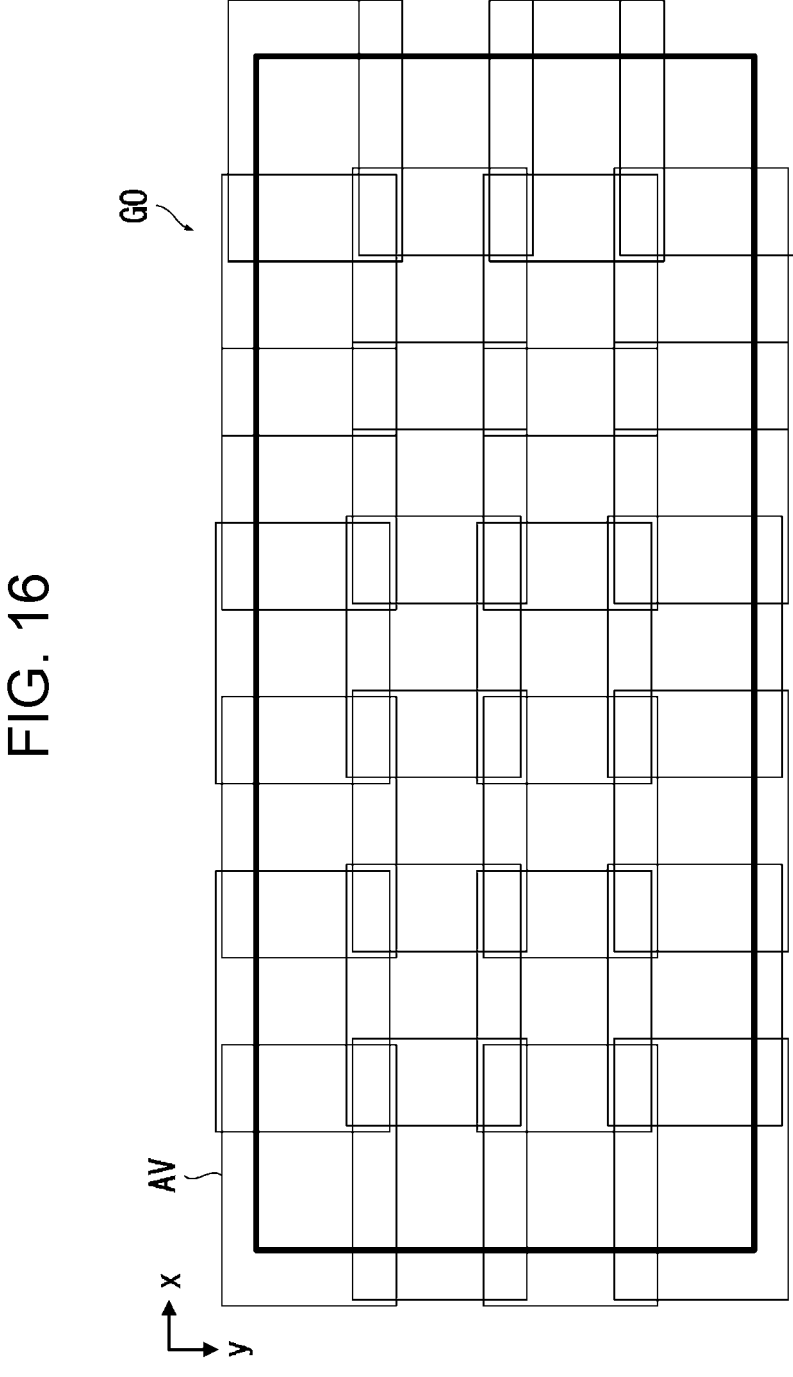
FIG. 16 is a conceptual diagram of capturing of images of segments.

First, captured images of segments will be described. FIG. 16 is a conceptual diagram of capturing of images of segments. FIG. 16 illustrates an example of inspecting (capturing an image of) a floor slab of a bridge.

The floor slab is typically inspected on a panel-by-panel basis. Panels GO are sections of the floor slab that are defined by main girders and cross beams. If an image of one entire panel GO cannot be captured in a single image capturing session or can be captured, but a high-resolution image is difficult to obtain, an image capturing area is divided into regions, and images of the regions are captured in multiple image capturing sessions. In FIG. 16, a frame indicated by reference symbol AV indicates a single imaging range. As illustrated in FIG. 16, images of the regions are captured such that adjacent regions partially overlap each other. The images are captured so as to have overlapping regions to implement accurate panoramic composition.

Functions of Information Processing Apparatus

When images of segments of an inspection area are captured at present and in the past, the information processing apparatus according to this embodiment calculates respective differences for the captured images of the segments and integrates the difference calculation results for the respective images to generate information on the total difference.

Figure 18:
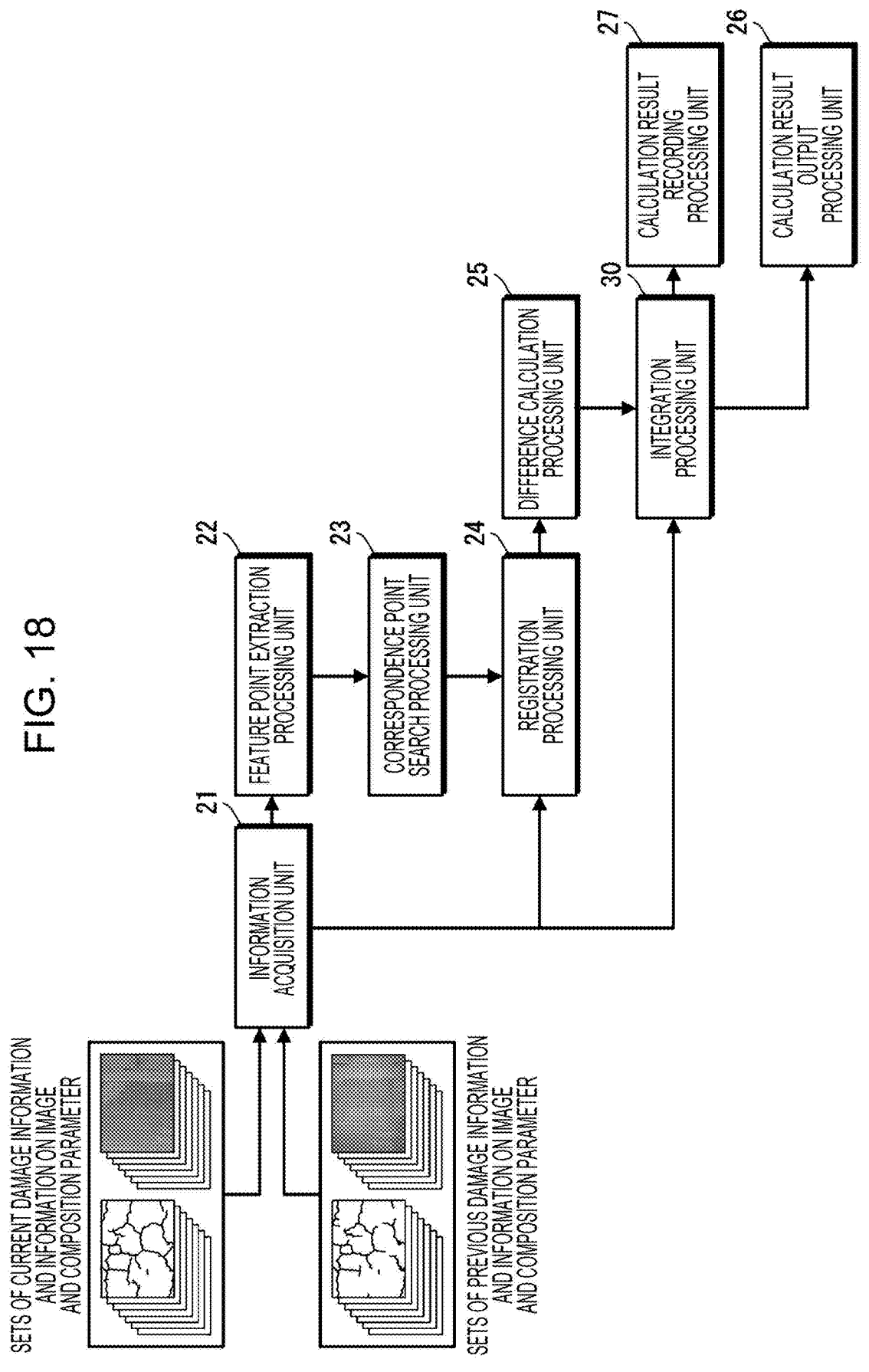
FIG. 18 is a block diagram of functions of the information processing apparatus.

FIG. 18 is a block diagram of functions of the information processing apparatus according to this embodiment.

It is assumed that the damage extraction processing and the panoramic composition processing have already been completed. As described above, the damage extraction processing is performed for each of the captured images of the segments. The damage information (information on cracks, free lime, and the like) extracted from each image is recorded in the auxiliary memory device 14 in association with information on an image as the source of extraction. The information on images and the damage information extracted from each of the images are stored in the auxiliary memory device 14 in association with information on a panoramic composite image and integrated damage information obtained by panoramic composition. That is, sets of pieces of information are stored. The information on the panoramic composite image includes information used for panoramic composition of the respective images, that is, composition parameter information necessary to perform panoramic composition processing on the respective images (composition processing information). The composition parameter information includes information on parameters for image deformation such as an affine transformation parameter, and so on. The panoramic composition processing of this type itself is a known technique and will not be described in detail.

As illustrated in FIG. 18, the information processing apparatus according to this embodiment is different from the information processing apparatus according to the first embodiment described above in further having the function of an integration processing unit 30.

The information acquisition unit 21 sequentially acquires information on the current and previous captured images of segments, and current damage information and previous damage information, which are extracted from the current and previous images, respectively. Further, composition parameter information necessary to perform panoramic composition processing on the images is acquired. These pieces of information are read and acquired from the auxiliary memory device 14.

The feature point extraction processing unit 22 individually extracts feature points from the current images and the previous images acquired by the information acquisition unit 21.

The correspondence point search processing unit 23 searches for corresponding feature points (correspondence points) between corresponding current and previous images.

Figure 19:
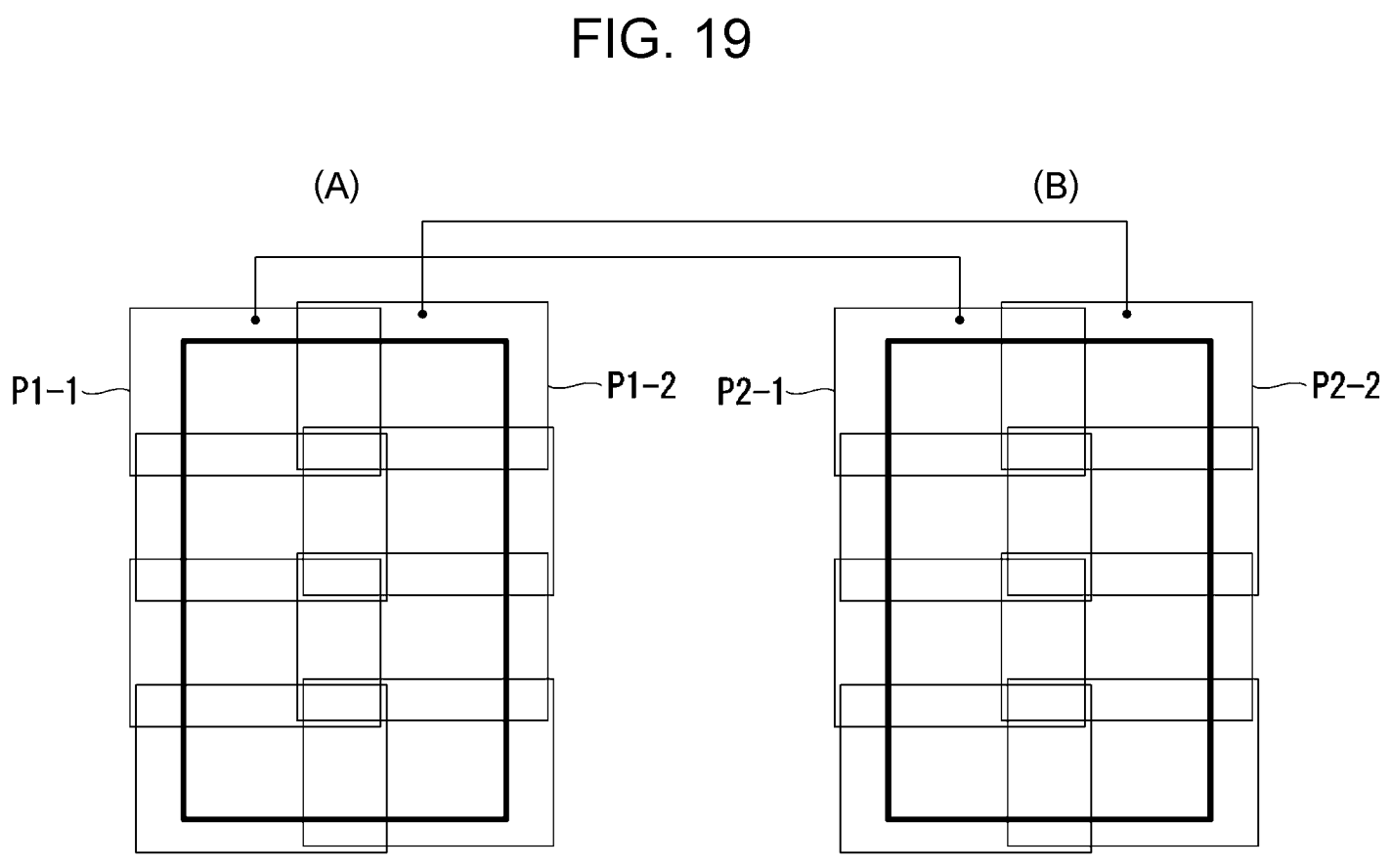

FIG. 19 is a diagram illustrating a correspondence relationship between current and previous captured images of segments.

Part (A) of FIG. 19 illustrates an imaging result of the current captured images of the segments, and part (B) of FIG. 19 illustrates an imaging result of the previous captured images of the segments. Parts (A) and (B) of FIG. 19 illustrate an example in which the target is divided into eight segments and images of the segments are captured.

In this case, an image P1-1 obtained by capturing an image of the region at the upper left corner at present and an image P2-1 obtained by capturing an image of the same region in the past are corresponding images. Likewise, an image P1-2 obtained by capturing an image of the region at the upper right corner at present and an image P2-2 obtained by capturing an image of the same region in the past are corresponding images. Accordingly, captured images of the same (substantially the same) region are corresponding images. The correspondence point search processing unit 23 searches for correspondence points between corresponding images.

The registration processing unit 24 performs registration of damage information between corresponding images. At this time, registration of the damage information is performed on the basis of information on correspondence points extracted between the corresponding images. For example, in the example illustrated in FIG. 19, registration processing is performed between damage information extracted from the current image P1-1 and damage information extracted from the previous image P2-1 corresponding to the current image P1-1. In registration, coarse registration processing followed by fine registration processing is performed.

The difference calculation processing unit 25 calculates a difference in damage information between the corresponding images. For example, in the example illustrated in FIG. 19, a difference is calculated between damage information extracted from the current image P1-1 and damage information extracted from the previous image P2-1 corresponding to the current image P1-1.

The integration processing unit 30 integrates pieces of information on differences in damage information, which are calculated between corresponding images. The integration processing unit 30 integrates the pieces of information on the differences by using the composition parameter information used for panoramic composition. For example, the pieces of information on the differences are integrated by using composition parameter information used for panoramic composition of the current captured images of the segments. As a result, information on the difference in damage information of the entire inspection-target region can be generated so as to correspond to a panoramic composite image.

The calculation result output processing unit 26 outputs a difference calculation result to the output device 16 in a predetermined format. In the information processing apparatus 10 according to this embodiment, the output device 16 is constituted by a display. Accordingly, the calculation result output processing unit 26 displays the difference calculation result on the display, which is a display destination.

The calculation result recording processing unit 27 records integrated difference calculation result information in the auxiliary memory device 14. At this time, the calculation result recording processing unit 27 records the integrated difference calculation result in the auxiliary memory device 14 in association with the current damage information and the previous damage information, which are also integrated.

Procedure of Difference Calculation Process

FIG. 20 is a flowchart illustrating a procedure of a process for calculating a difference in damage information, which is performed by the information processing apparatus according to this embodiment.

First, a process is performed on the current damage information and the previous damage information to be processed to acquire information on respective captured images of segments, damage information extracted from each image, and composition parameter information (step S11). Then, a process of individually extracting feature points from each of the acquired images is performed (step S12). Then, a process of searching for corresponding feature points (correspondence points) between corresponding current and previous images is performed (step S13). Then, a process of performing registration between the corresponding current damage information and previous damage information is performed (step S14). The registration processing is performed by using information on correspondence points determined between corresponding images. Coarse registration processing followed by fine registration processing is performed. Then, a process of calculating a difference between the corresponding current damage information and previous damage information is performed (step S15). Then, a process of integrating difference calculation results calculated between the corresponding current damage information and previous damage information is performed (step S16). Then, a process of outputting the integrated difference calculation result is performed (step S17). Then, a process of recording the integrated difference calculation result is performed (step S18).

As described above, the information processing apparatus according to this embodiment can accurately calculate a difference when pieces of damage information are integrated by panoramic composition.

In the embodiment described above, description has been made assuming that panoramic composition processing has already been completed for the current and previous captured images of segments. Alternatively, the information processing apparatus may have a panoramic composition processing function, and panoramic composition processing may be performed in the apparatus.

Third Embodiment

This embodiment describes processing in a case where the extraction range of damage is different between two pieces of damage information between which a difference is calculated. The case where the extraction range of damage is different between two pieces of damage information between which a difference is calculated is a case where the imaging range is different between images from which the pieces of damage information are extracted.

Figure 21:
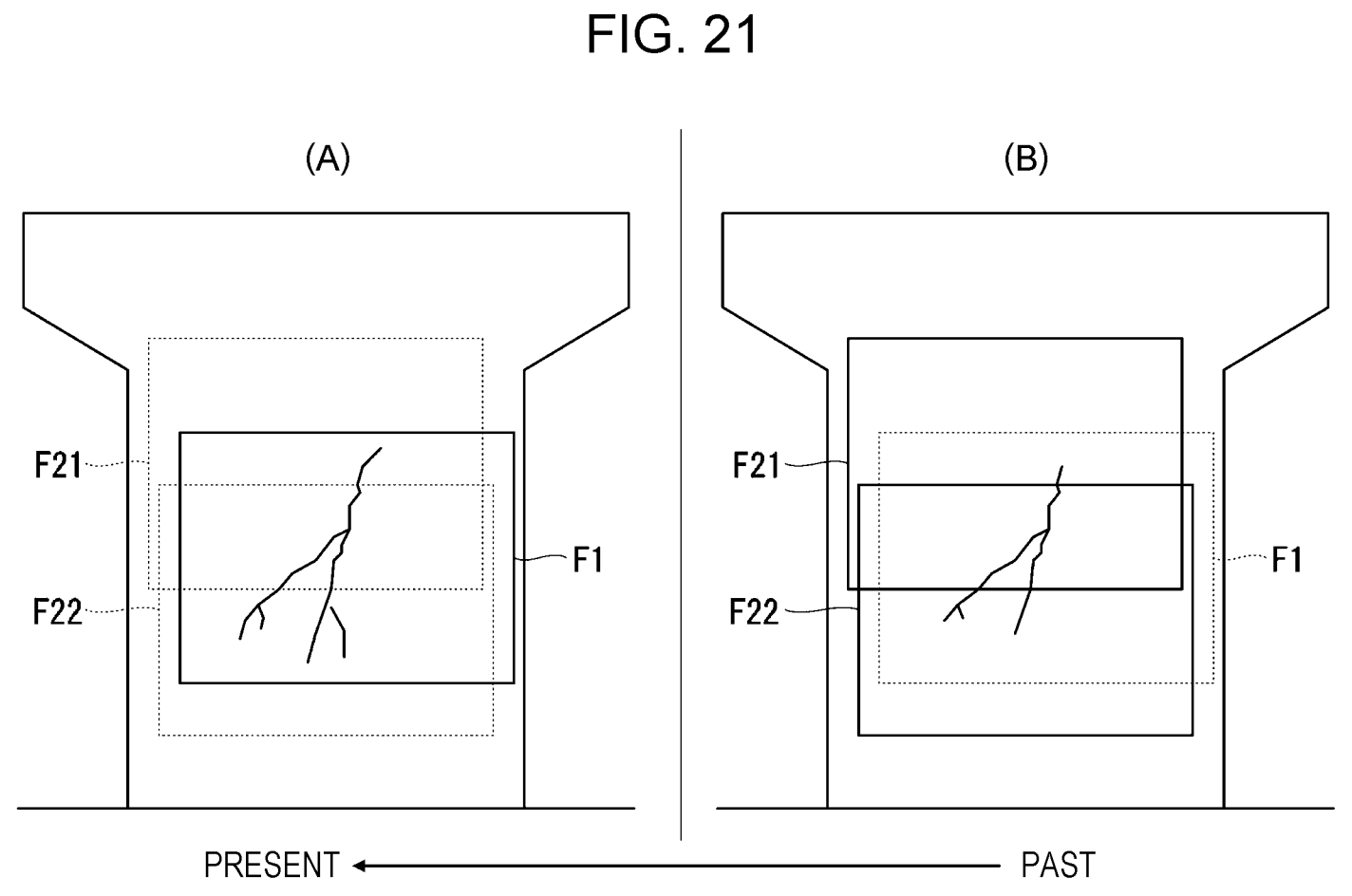

FIG. 21 is a conceptual diagram of an imaging range.

FIG. 21 illustrates an example of inspecting a bridge pier. Part (A) of FIG. 21 illustrates the bridge pier at present. Part (B) of FIG. 21 illustrates the bridge pier inspected in the past.

In FIG. 21, a frame F1 indicates an imaging range of a captured image of the bridge pier at present. A frame F21 indicates an imaging range of a first image captured when the bridge pier was inspected in the past, and a frame F22 indicates an imaging range of a second image.

As illustrated in FIG. 21, the imaging range (the range indicated by the frame F1) of the captured image of the bridge pier at present does not match the imaging range (the range indicated by the frame F21) of the first image captured when the bridge pier was inspected in the past. The imaging range of the captured image of the bridge pier at present does not also match the imaging range of the second image captured when the bridge pier was inspected in the past (the range indicated by the frame F22).

As described above, if the imaging range does not match that of an image captured during a previous inspection, the information processing apparatus performs the difference calculation process in a range in which the images overlap. If a plurality of images have an overlapping range, the information processing apparatus integrates pieces of information on differences calculated between the plurality of images to determine a difference from previous inspection results. For example, in the example illustrated in FIG. 21, the information processing apparatus first calculates a difference in an overlapping region between the damage information extracted from the current image and the damage information extracted from the previous first image. Likewise, the information processing apparatus calculates a difference in an overlapping region between the damage information extracted from the current image and the damage information extracted from the previous second image. Then, the information processing apparatus integrates the respective calculation results to generate information on a difference from the previous inspection results. That is, the information processing apparatus generates information on the difference by complementing information on lacking regions.

Functions of Information Processing Apparatus

Figure 22:
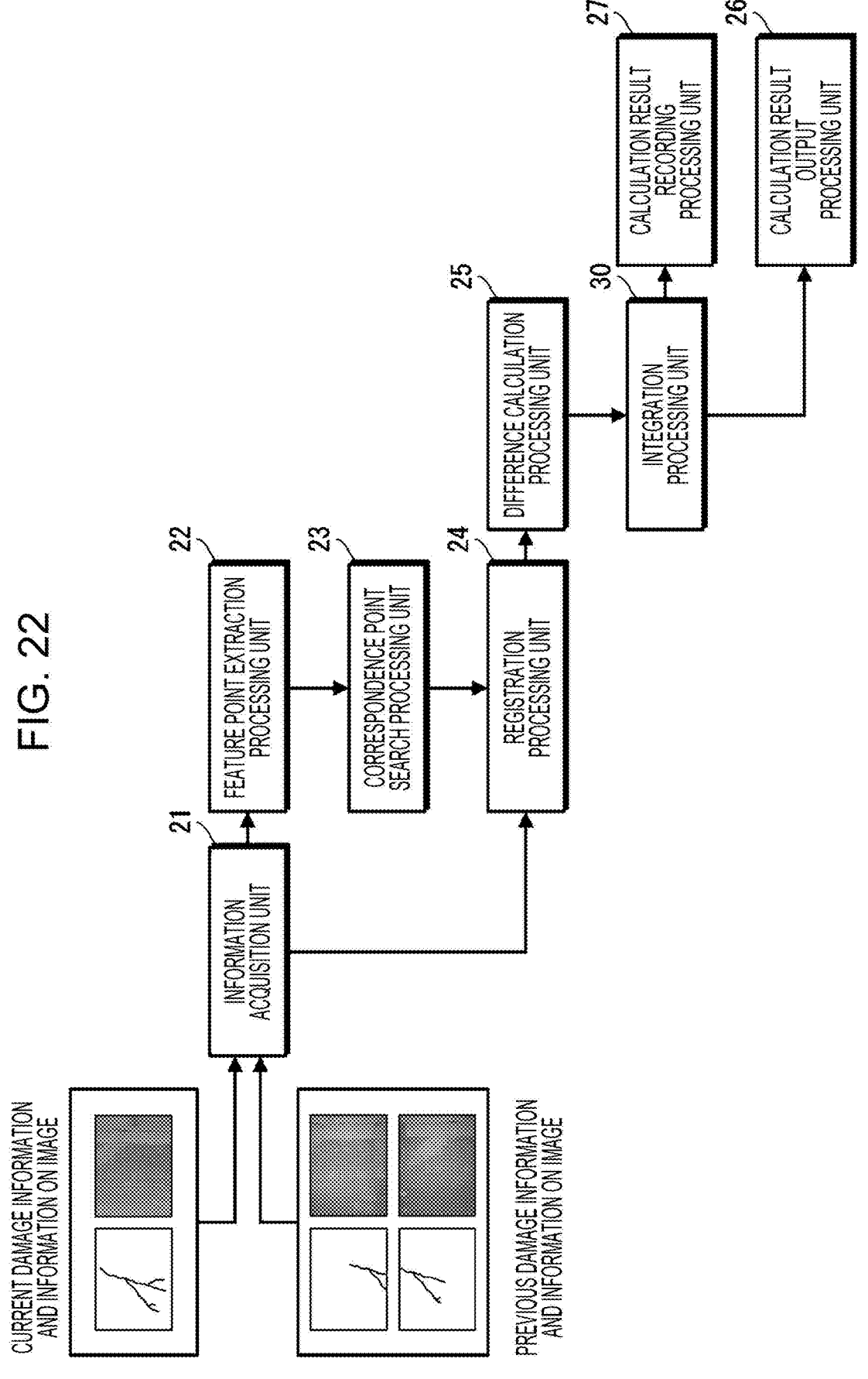
FIG. 22 is a block diagram of functions of the information processing apparatus.

FIG. 22 is a block diagram of functions of the information processing apparatus according to this embodiment.

As illustrated in FIG. 22, the information processing apparatus according to this embodiment has the functions of an information acquisition unit 21, a feature point extraction processing unit 22, a correspondence point search processing unit 23, a registration processing unit 24, a difference calculation processing unit 25, an integration processing unit 30, a calculation result output processing unit 26, and a calculation result recording processing unit 27.

The information acquisition unit 21 acquires current damage information and previous damage information between which a difference is calculated, information on a current image from which the current damage information is extracted, and information on a previous image from which the previous damage information is extracted. In this embodiment, it is assumed that the damage extraction processing has already been completed. As the previous damage information and the information on the previous image, a plurality of pieces of damage information having regions overlapping with the current damage information and information on the previous image are acquired.

The feature point extraction processing unit 22 individually extracts feature points from the current and previous images acquired by the information acquisition unit 21.

The correspondence point search processing unit 23 individually searches for corresponding feature points (correspondence points) between the current image and a plurality of previous images.

The registration processing unit 24 individually performs registration between the current damage information and a plurality of pieces of previous damage information. At this time, registration of the damage information is performed on the basis of information on correspondence points extracted between the images. For example, two pieces of damage information including first damage information and second damage information are present as pieces of previous damage information. In this case, registration is performed between the current damage information and the previous first damage information, and registration is performed between the current damage information and the previous second damage information.

The difference calculation processing unit 25 calculates a difference in an overlapping region between the current damage information and the plurality of pieces of previous damage information after the registration processing.

Figure 23:
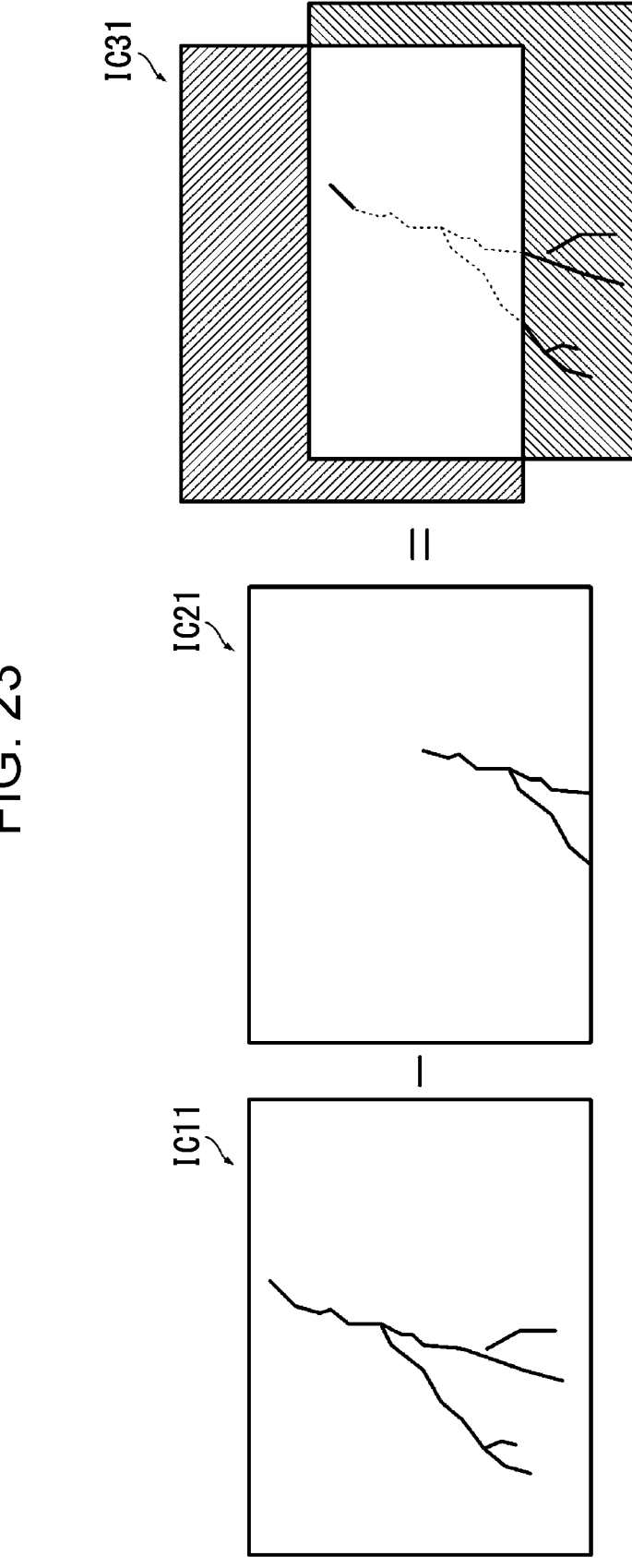
FIG. 23 is a conceptual diagram of a process for calculating a difference in crack length.
Figure 24:
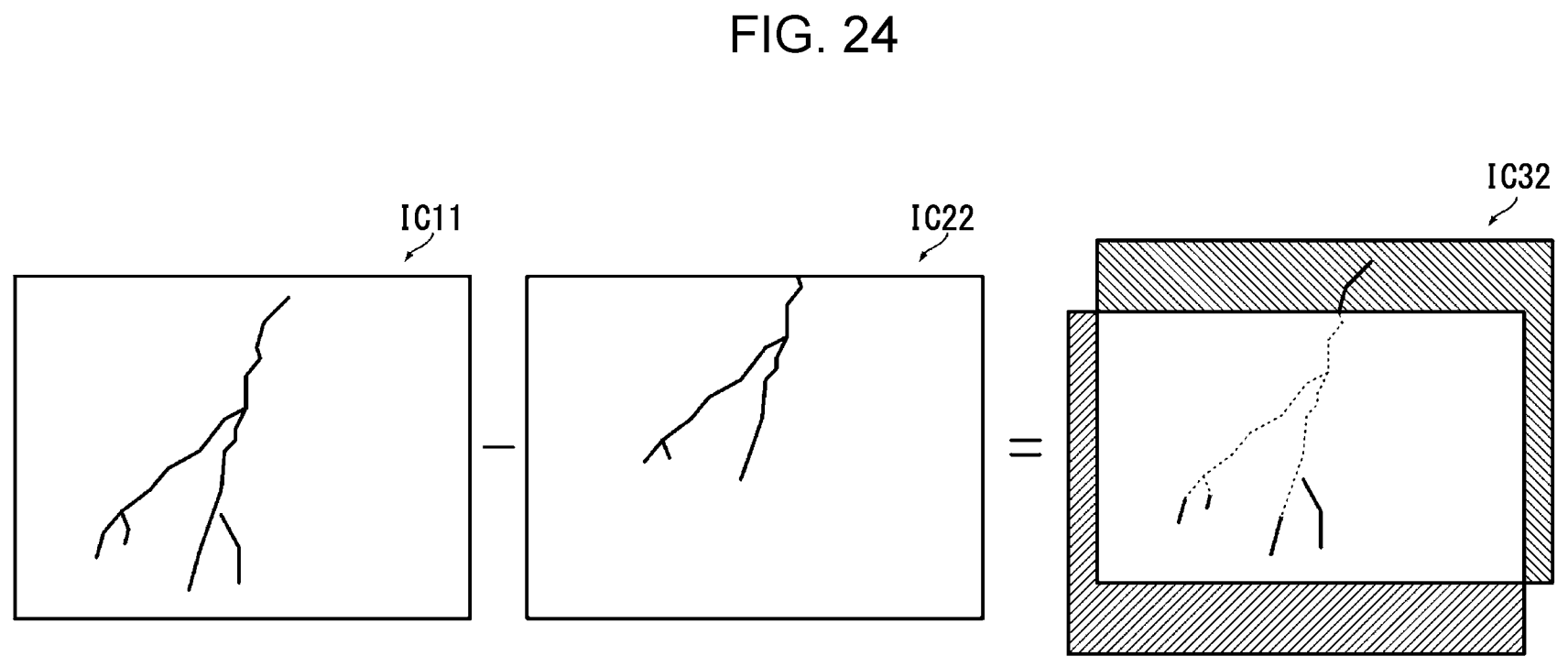

FIG. 23 and FIG. 24 are conceptual diagrams of a process for calculating a difference in crack length in a case where damage information is crack information.

FIG. 23 and FIG. 24 illustrate examples in which two pieces of previous damage information IC21 and IC22 having regions overlapping with current damage information IC11 are present. FIG. 23 is a conceptual diagram illustrating calculation of a difference between the current damage information IC11 and the previous first damage information IC21. FIG. 24 is a conceptual diagram illustrating calculation of a difference between the current damage information IC11 and the previous second damage information IC22.

As illustrated in FIG. 23, the current damage information IC11 and the previous first damage information IC21 partially overlap. Difference information IC31 is calculated in a region in which the two pieces of damage information overlap. In the difference information IC31, a line represented by a solid line is a line representing a crack calculated as a difference. In this example, the line is a line of a crack found only at present. A line represented by a broken line is a line representing a common crack at present and in the past.

Likewise, as illustrated in FIG. 24, the current damage information IC11 and the previous second damage information IC22 partially overlap. Difference information IC32 is calculated in a region in which the two pieces of damage information overlap. In the difference information IC32, a line represented by a solid line is a line representing a crack calculated as a difference. In this example, the line is a line of a crack found only at present. A line represented by a broken line is a line representing a common crack at present and in the past.

The integration processing unit 30 integrates difference calculation results calculated between the current damage information and the plurality of pieces of previous damage information.

Figure 25:
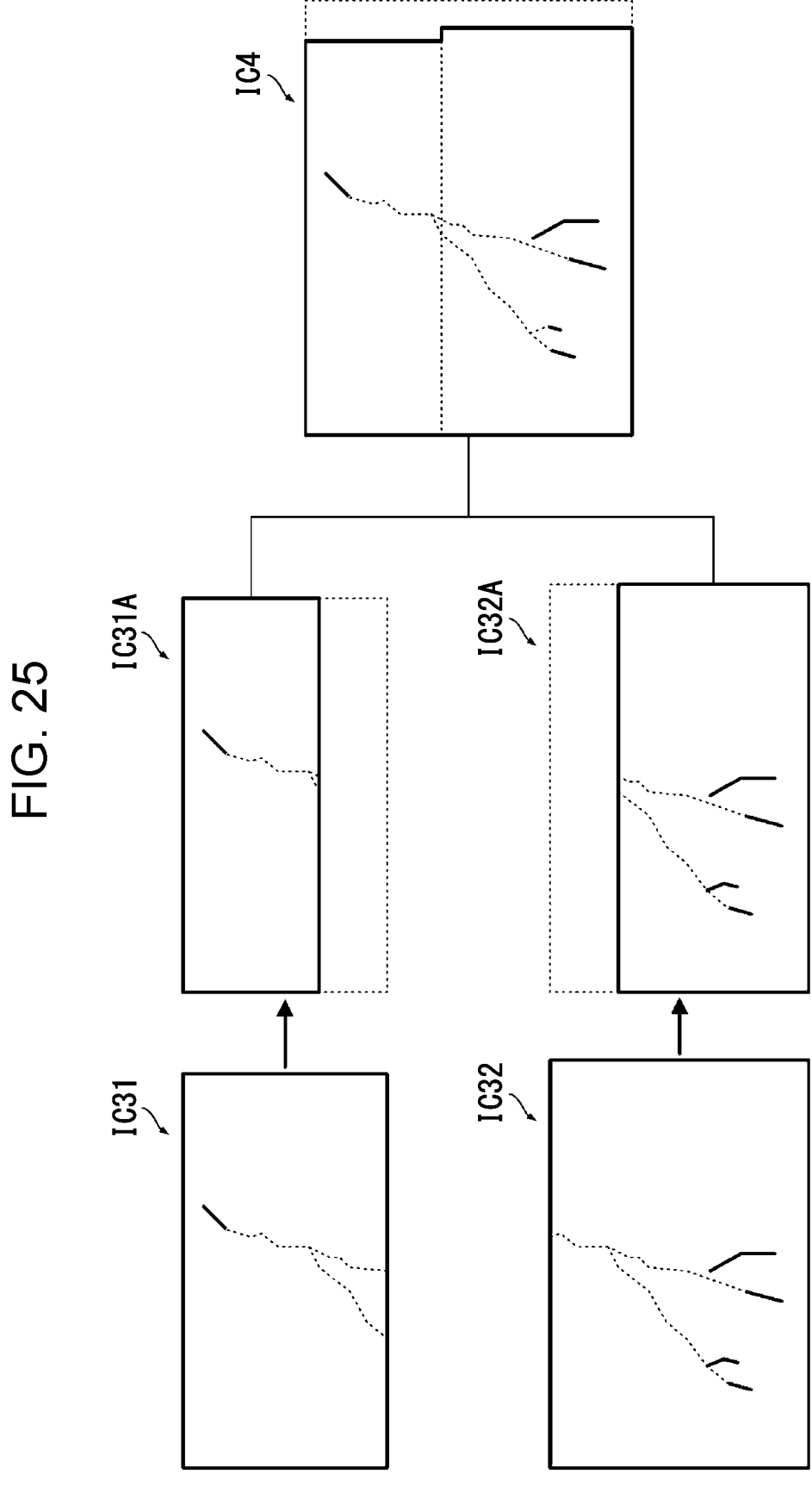
FIG. 25 is a conceptual diagram of an integration process.

FIG. 25 is a conceptual diagram of an integration process.

As illustrated in FIG. 25, the first difference information IC31 calculated between the current damage information IC11 and the previous first damage information IC21 and the second difference information IC32 calculated between the current damage information IC11 and the previous second damage information IC22 are integrated to obtain entire difference information IC4.

In the example illustrated in FIG. 25, the first difference information IC31 and the second difference information IC32 are each vertically divided into two sections, and sections including an overlapping region are removed. The remaining sections, namely, first difference information IC31A and second difference information IC32A, are combined to generate the entire difference information IC4.

The integration process may be implemented using any other known method. For example, a method of composition processing, such as alpha blending or Laplacian blending, may be employed.

The calculation result output processing unit 26 outputs a difference calculation result to the output device 16 in a predetermined format. In the information processing apparatus 10 according to this embodiment, the output device 16 is constituted by a display. Accordingly, the calculation result output processing unit 26 displays the difference calculation result on the display, which is a display destination.

The calculation result recording processing unit 27 records integrated difference calculation result information in the auxiliary memory device 14 in association with the current damage information and the previous damage information.

Procedure of Difference Calculation Process

FIG. 26 is a flowchart illustrating a procedure of a process for calculating a difference in damage information, which is performed by the information processing apparatus according to this embodiment.

First, a process of acquiring current damage information and a plurality of pieces of previous damage information to be processed, and information on images from which the current damage information and the previous damage information are extracted is performed (step S21). Then, a process of individually extracting feature points from each of the acquired images is performed (step S22). Then, a process of individually searching for corresponding feature points (correspondence points) between a current image and a plurality of previous images is performed (step S23). Then, a process of performing registration between the current damage information and the plurality of pieces of previous damage information is performed (step S24). The registration processing is performed using information on correspondence points determined between the images, and coarse registration processing followed by fine registration processing is performed. Then, a process of individually calculating differences between the current damage information and the plurality of pieces of previous damage information is performed (step S25). Then, a process of integrating a plurality of difference calculation results calculated between the current damage information and the plurality of pieces of previous damage information is performed (step S26). Then, a process of outputting the integrated difference calculation result is performed (step S27). Then, a process of recording the integrated difference calculation result is performed (step S28).

As described above, the information processing apparatus according to this embodiment can prevent the occurrence of a region in which no difference from a previous inspection result can be calculated, even if the extraction range of previous damage information is different from the extraction range of current damage information.

In the example presented in the embodiment described above, a case where the pieces of previous damage information overlap has been described as an example. However, pieces of previous damage information need not necessarily overlap. The pieces of previous damage information are only required to have a region overlapping with the current damage information.

The technique described in this embodiment can also be applied to calculation of differences between captured images of segments. For example, a difference can be calculated for damage information extracted at present from a captured image of one segment region by using damage information extracted from a plurality of previous images.

Fourth Embodiment

In a case where an extraction range of current damage information and an extraction range of previous damage information are different, the information processing apparatus can calculate a difference only in an overlapping region between the two extraction ranges.

Figure 27:
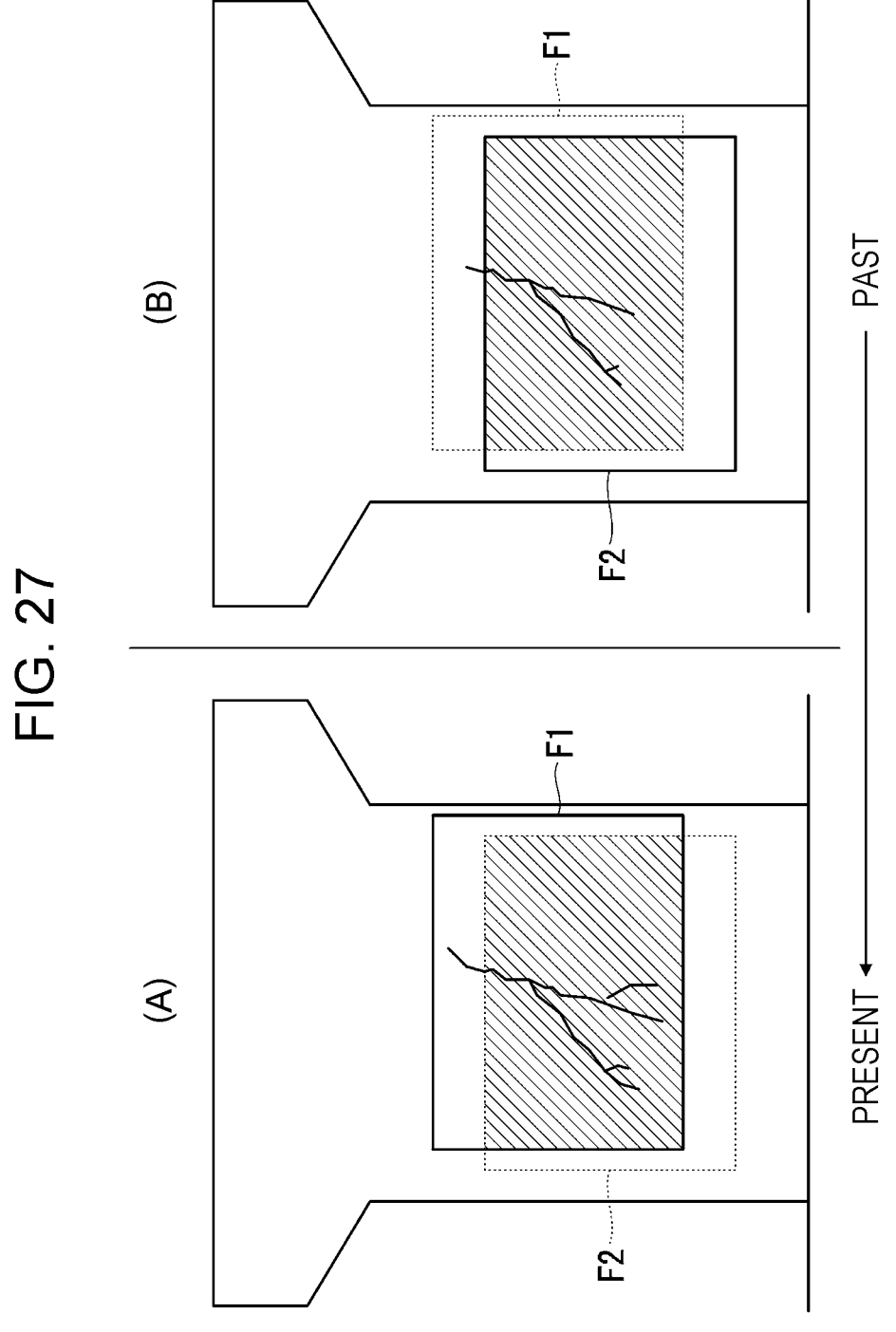
FIG. 27 is a conceptual diagram illustrating an example of a case where an extraction range of current damage information and an extraction range of previous damage information are different.

FIG. 27 is a conceptual diagram illustrating an example of a case where an extraction range of current damage information and an extraction range of previous damage information are different.

Part (A) of FIG. 27 illustrates a bridge pier at present. Part (B) of FIG. 27 illustrates the bridge pier inspected in the past. In FIG. 27, a frame F1 indicates an imaging range of a captured image of the bridge pier at present. The current damage information is extracted in the range of the frame F1. A frame F2 indicates an imaging range of an image captured when the bridge pier was inspected in the past. The previous damage information is extracted in the range of the frame F2. As illustrated in FIG. 27, the extraction range of the current damage information (the range of the frame F1) and the extraction range of the previous damage information (the range of the frame F2) are different. In this case, as illustrated in FIG. 27, a region indicated by shading with diagonal lines is an overlapping region in the current damage information and the previous damage information. The information processing apparatus can calculate a difference only in this overlapping region. That is, in the ranges indicated by the frames F1 and F2, regions other than the region indicated by shading with diagonal lines are regions in which no difference can be calculated. As described above, in a case where the extraction range of the current damage information and the extraction range of the previous damage information are different, a range in which a difference can be calculated in images from which the pieces of damage information are extracted is preferably clearly indicated to the user. This makes it possible to clearly grasp a region in which a difference is successfully extracted, and to improve convenience.

Functions of Information Processing Apparatus

Here, only the function of clearly indicating a region in which a difference is calculated in an image will be described.

Figure 28:
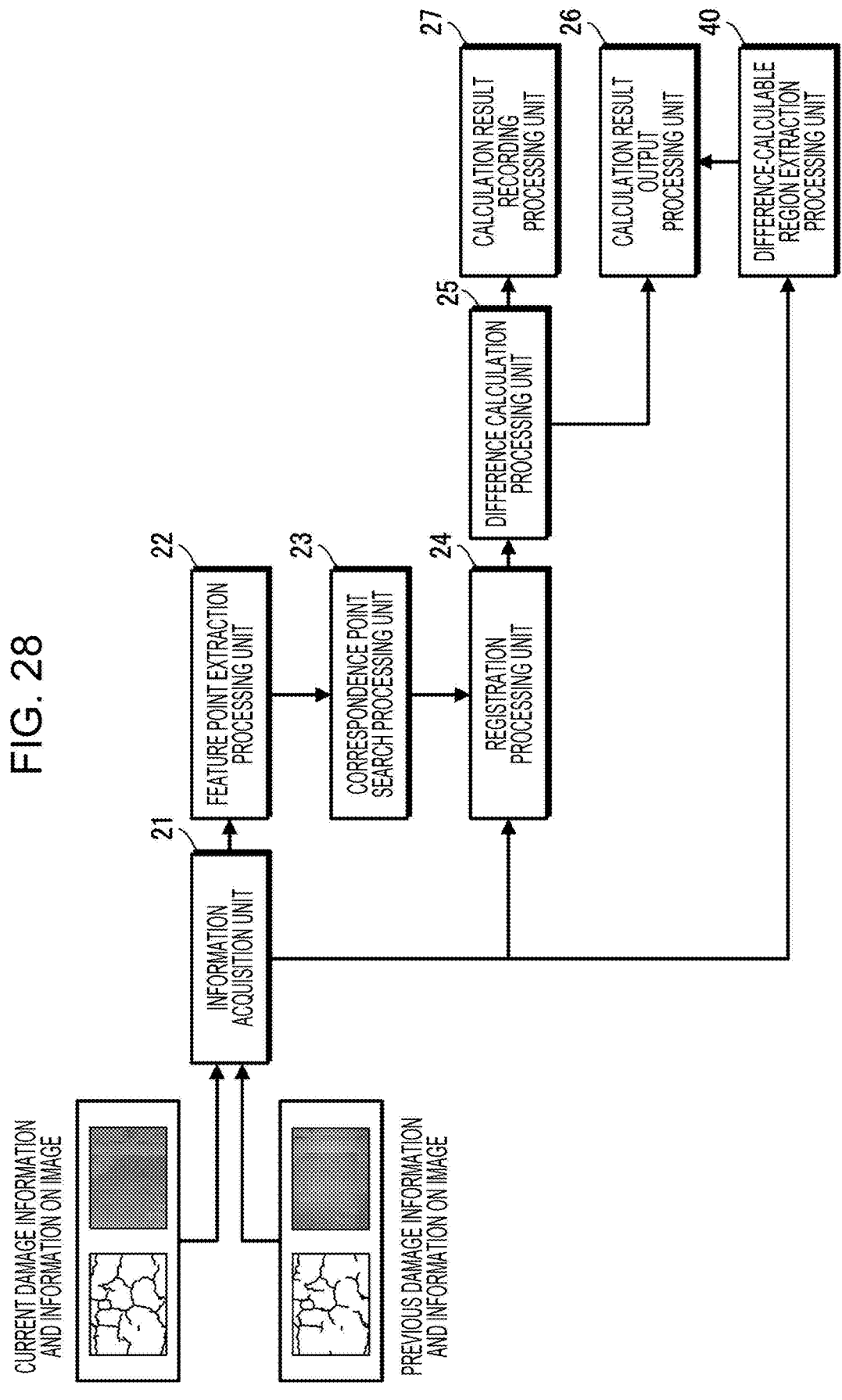
FIG. 28 is a block diagram of functions of the information processing apparatus.

FIG. 28 is a block diagram of functions of the information processing apparatus according to this embodiment.

As illustrated in FIG. 28, the information processing apparatus according to this embodiment further has the function of a difference-calculable region extraction processing unit 40 in addition to the functions that the information processing apparatus according to the first embodiment has.

The difference-calculable region extraction processing unit 40 extracts a region in which a difference in damage information can be calculated (difference-calculable region) on the basis of information on the current and previous images acquired by the information acquisition unit 21. A region in which damage information can be calculated between the current and previous images is a region in which the two images overlap. Accordingly, the difference-calculable region extraction processing unit 40 extracts a region in which the current and previous images overlap to extract a difference-calculable region.

Information on the difference-calculable region extracted by the difference-calculable region extraction processing unit 40 is added to the calculation result output processing unit 26. The calculation result output processing unit 26 generates and outputs an image indicating information on the difference-calculable region in the current or previous image. In this embodiment, the information on the difference-calculable region is output together with the difference calculation result information.

Figure 29:
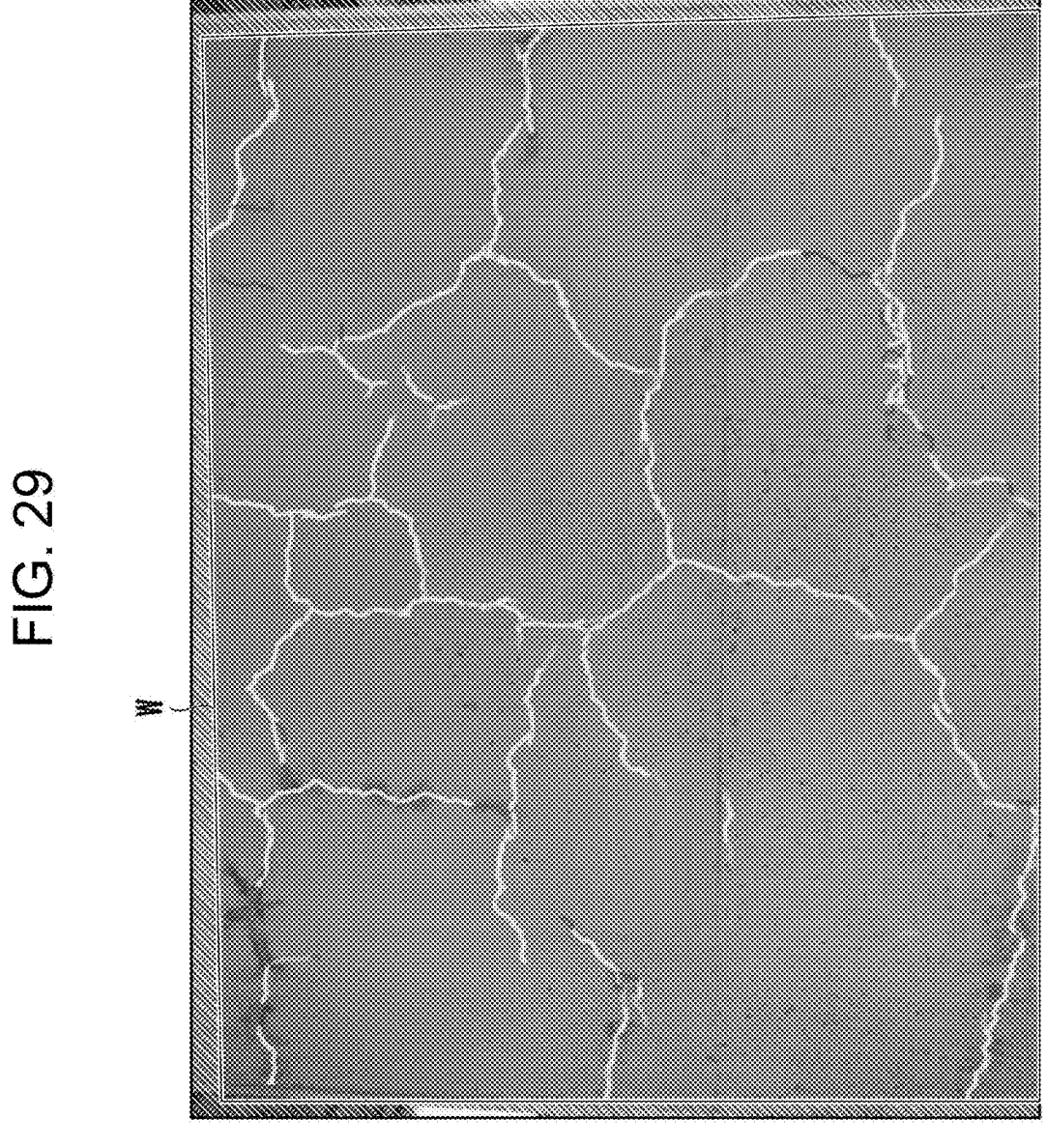
FIG. 29 is a diagram illustrating an example of an output difference-calculable region.

FIG. 29 is a diagram illustrating an example of an output difference-calculable region.

FIG. 29 illustrates an example of a case where a difference calculation result and the information on the difference-calculable region are displayed superimposed on the current image.

The difference calculation result is a result of calculating differences in crack length. In the example illustrated in FIG. 29, the difference calculation results are displayed in a different color.

The information on the difference-calculable region is indicated by enclosing a range in which the differences are calculated with a frame W. In this example, furthermore, regions in which no difference is calculated are indicated by shading with diagonal lines. The regions in which no difference is calculated may be distinguished by any other method such as making the image semitransparent.

As described above, the information processing apparatus according to this embodiment makes it possible to clearly grasp a region in which a difference is successfully extracted, even if the extraction range of the current damage information and the extraction range of the previous damage information are different. As a result, convenience can further be improved.

The difference-calculable region may be extracted on the basis of the current damage information and the previous damage information. In this case, the difference-calculable region may be extracted on the basis of the current damage information and the previous damage information after the registration processing. Also in the case of extraction from an image, it is preferable to perform registration processing to extract a difference-calculable region.

Information on the extracted difference-calculable region is preferably recorded in association with difference calculation result information.

Fifth Embodiment

In a case where images of segments of an inspection areas are captured, the information processing apparatus calculates a difference in damage information after performing panoramic composition.

Functions of Information Processing Apparatus

Figure 30:
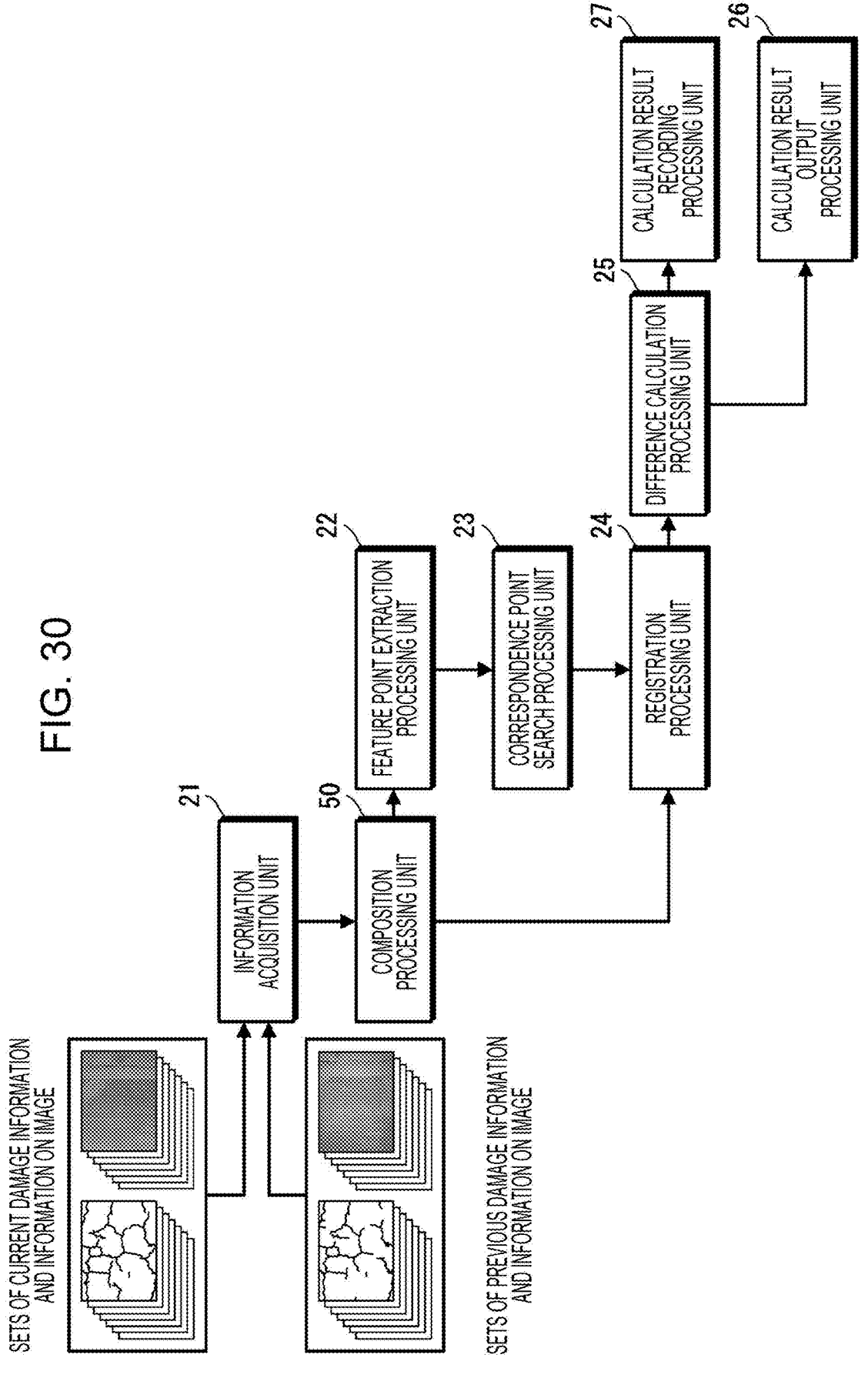
FIG. 30 is a block diagram of functions of the information processing apparatus.

FIG. 30 is a block diagram of functions of the information processing apparatus.

The information processing apparatus according to this embodiment is different from the information processing apparatus according to the first embodiment described above in having the function of a composition processing unit 50.

The information acquisition unit 21 sequentially acquires information on the current and previous captured images of segments and damage information extracted from the current and previous images.

The composition processing unit 50 performs panoramic composition on the current and previous captured images of the segments. The panoramic composition processing itself is known processing and will not be described here in detail.

The composition processing unit 50 also uses a composition parameter for panoramic composition to integrate the current damage information and the previous damage information. That is, damage information corresponding to a panoramic composite image is generated.

The feature point extraction processing unit 22 extracts feature points from the current and previous images after panoramic composition.

The correspondence point search processing unit 23 searches for corresponding feature points (correspondence points) between the current and previous images after panoramic composition.

The registration processing unit 24 performs registration of damage information between the current and previous images after panoramic composition. At this time, registration of the damage information is performed on the basis of information on correspondence points extracted between the current and previous images after panoramic composition. In the registration processing, coarse registration processing followed by fine registration processing is performed.

The difference calculation processing unit 25 calculates a difference in damage information between the current and previous images after panoramic composition.

The calculation result output processing unit 26 outputs a difference calculation result to the output device 16 in a predetermined format.

The calculation result recording processing unit 27 records integrated difference calculation result information in the auxiliary memory device 14.
Procedure of Difference Calculation Process FIG. 31 is a flowchart illustrating a procedure of a process for calculating a difference in damage information, which is performed by the information processing apparatus according to this embodiment.

First, a process is performed on the current damage information and the previous damage information to be processed to acquire information on respective captured images of segments and damage information extracted from each image (step S31). Then, a process of performing panoramic composition on the acquired current and previous images is performed (step S32). As a result, a single captured image of the entire inspection area is generated. Then, a process of integrating the current damage information and the previous damage information using the composition parameter used for panoramic composition is performed (step S33). As a result, damage information of the entire inspection area is generated so as to correspond to a panoramic composite image. Then, a process of individually extracting feature points from the current and previous images after panoramic composition is performed (step S34). Then, a process of searching for corresponding feature points (correspondence points) between the current and previous images after panoramic composition is performed (step S35). Then, a process of performing registration between the current damage information and the previous damage information after integration is performed (step S36). The registration processing is performed by using information on correspondence points determined between the current and previous images after panoramic composition. Coarse registration processing followed by fine registration processing is performed. Then, a process of calculating a difference between the current damage information and the previous damage information after integration is performed (step S37). Then, a process of outputting the difference calculation result is performed (step S38). Then, a process of recording the difference calculation result is performed (step S39).

As described above, the information processing apparatus according to this embodiment calculates a difference in damage information after panoramic composition in a case where images of segments of an inspection area are captured.

In the embodiment described above, an example has been described in which images of segments of an inspection area are captured both at present and in the past. However, in a case where images of segments of an inspection area are captured only either at present or in the past, the composition processing is performed only on the inspection result for which the images of the segments are captured. For example, if images of segments are captured for only the previous inspection result, the composition processing is performed only on the previous inspection result.

In the embodiment described above, the information processing apparatus has the function of performing the composition processing. However, the composition processing may be performed by another apparatus.

Other Embodiments

In the embodiments described above, the hardware structure for performing various kinds of processes performed by the information processing apparatus is implemented as various processors as described below. The various processors include a CPU that is a general-purpose processor configured to execute software (program) to function as various processing units, a programmable logic device (PLD) that is a processor whose circuit configuration can be changed after manufacturing, such as a field programmable gate array (FPGA), a dedicated electric circuit that is a processor having a circuit configuration designed specifically for executing specific processing, such as an application specific integrated circuit (ASIC), and so on.

A single processing unit may be configured by one of the various processors or by a combination of two or more processors of the same type or different types (e.g., a plurality of FPGAs or a combination of a CPU and an FPGA). Alternatively, a plurality of processing units may be configured as a single processor. In examples of configuring a plurality of processing units as a single processor, first, as typified by a computer such as a client or a server, one or more CPUs and software are combined to configure a single processor, and the processor functions as the plurality of processing units. The examples include, second, a form in which, as typified by a system on chip (SoC) or the like, a processor is used in which the functions of the entire system including the plurality of processing units are implemented as one integrated circuit (IC) chip. As described above, the various processing units are configured by using one or more of the various processors described above as a hardware structure.

More specifically, the hardware structure of the various processors is an electric circuit (circuitry) in which circuit elements such as semiconductor elements are combined.

The configurations and functions described above can be each implemented by any hardware, software, or a combination of both, as appropriate. For example, the present invention is also applicable to a program that causes a computer to execute the processing steps (processing procedure) described above, a computer-readable recording medium (non-transitory recording medium) storing the program, or a computer into which the program is installable.

It goes without saying that while examples of the present invention have been described, the present invention is not limited to the embodiments described above, and various modifications may be made without departing from the gist of the present invention.

REFERENCE SIGNS LIST 10 information processing apparatus
11 CPU
12 ROM
13 RAM
14 auxiliary memory device
15 input device
16 output device
17 input/output interface
18 communication interface
21 information acquisition unit
22 feature point extraction processing unit
23 correspondence point search processing unit
24 registration processing unit
24A coarse registration processing unit
24B fine registration processing unit
25 difference calculation processing unit
25A pairing processing unit
25B first difference calculation unit
25C second difference calculation unit
26 calculation result output processing unit
27 calculation result recording processing unit
30 integration processing unit
40 difference-calculable region extraction processing unit
50 composition processing unit
AV frame indicating single imaging range in captured images of segments
EI enlarged image of portion of image displayed as calculation result
F1 frame indicating imaging range in captured image of bridge pier at present
F2 frame indicating imaging range of image captured when bridge pier was inspected in past
F21 frame indicating imaging range of first image captured when bridge pier was inspected in past
F22 frame indicating imaging range of second image captured when bridge pier was inspected in past
GO panel
I1 current image
I2 previous image
IC1 current crack information
IC2 previous crack information
IC3 crack length difference information
IC4 entire difference information
IC11 current damage information
IC21 previous first damage information
IC22 previous second damage information
IC31 first difference information
IC31A first difference information after removal of overlapping region
IC32 second difference information
IC32A second difference information after removal of overlapping region
IR1 information on current damaged region (free-lime-generated region)

IR2 information on previous damaged region (free-lime-generated region)
IR3 difference calculation result information of damaged regions
L straight line connecting corresponding feature points
OI image displayed as result of calculating difference in crack length
OI1 image displayed as result of calculating difference in crack length
OI2 image displayed as result of calculating difference in crack length
OI3 image displayed as result of calculating difference in crack length
OI4 image displayed as result of calculating difference in crack length
OI5 image displayed as result of calculating difference in crack length
OI6 image displayed as result of calculating difference in crack length
P1-1 current captured image of segment
P1-2 current captured image of segment
P2-1 previous captured image of segment
P2-2 previous captured image of segment
V1-1 current crack vector
V1-2 current crack vector
V1-3 current crack vector
V1-4 current crack vector
V1-5 current crack vector
V1-6 current crack vector
V2-1 previous crack vector
V2-2 previous crack vector
V2-3 previous crack vector
V2-4 previous crack vector
V2-5 previous crack vector
W frame indicating range in which difference is calculated
S1 to S7 procedure of process for calculating difference in damage information (crack information)
S4A to S4D procedure of registration processing
S5A to S5C procedure of difference calculation process
S11 to S18 procedure of process for calculating difference in damage information
S21 to S28 procedure of process for calculating difference in damage information
S31 to S39 procedure of process for calculating difference in damage information

What is claimed is:

1. An information processing apparatus comprising a processor configured to:

acquire a first image obtained by capturing an image of a structure and first damage information of the structure extracted from the first image;

acquire a second image obtained by capturing an image of the structure at a time point different from a time point at which the first image is captured and second damage information of the structure extracted from the second image;

extract a plurality of feature points from the first image;

extract a plurality of feature points from the second image;

search for corresponding feature points between the first image and the second image;

perform coarse registration followed by fine registration on the first damage information and the second damage information on the basis of information on the corresponding feature points to perform registration between the first damage information and the second damage information; and calculate a difference between the first damage information and the second damage information after the registration,
wherein
in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired,
the processor is configured to:
  individually extract a plurality of feature points from the first images;
  individually extract a plurality of feature points from the second images;
  search for corresponding feature points between a first image and a second image that correspond to each other among the first images and the second images;
  perform registration between a piece of first damage information and a piece of second damage information that correspond to each other among the pieces of first damage information and the pieces of second damage information;
  calculate a difference between the piece of first damage information and the piece of second damage information that correspond to each other;
  acquire composition processing information necessary for panoramic composition of the plurality of first images; and
  combine differences, each calculated between one of the first images and a corresponding one of the second images, on the basis of the composition processing information.

2. The information processing apparatus according to claim 1, wherein
the processor is configured to:
perform rigid registration as the coarse registration; and
perform non-rigid registration as the fine registration.

3. The information processing apparatus according to claim 1, wherein
the processor is configured to:
perform rigid registration as the coarse registration; and
perform, as the fine registration, registration by correcting a difference in lens distortion.

4. The information processing apparatus according to claim 1, wherein
the first damage information and the second damage information are crack information, and
the processor is configured to calculate a difference in crack width and/or length.

5. The information processing apparatus according to claim 4, wherein
the processor is configured to generate a pair of corresponding cracks and calculate a difference in width between the corresponding cracks in the pair to calculate a difference in crack width.

6. The information processing apparatus according to claim 4, wherein
the processor is configured to generate a pair of corresponding cracks and calculate a length of a crack that is not paired to calculate a difference in crack length.

7. The information processing apparatus according to claim 5, wherein
the processor is configured to generate a pair of adjacent cracks.

8. The information processing apparatus according to claim 5, wherein
the processor is configured to generate a pair of corresponding cracks by DP matching.

9. The information processing apparatus according to claim 1, wherein
the first damage information and the second damage information are damaged-region information, and
the processor is configured to calculate a difference between corresponding damaged regions.

10. An information processing apparatus, comprising a processor configured to:
acquire a first image obtained by capturing an image of a structure and first damage information of the structure extracted from the first image;
acquire a second image obtained by capturing an image of the structure at a time point different from a time point at which the first image is captured and second damage information of the structure extracted from the second image;
extract a plurality of feature points from the first image;
extract a plurality of feature points from the second image;
search for corresponding feature points between the first image and the second image;
perform coarse registration followed by fine registration on the first damage information and the second damage information on the basis of information on the corresponding feature points to perform registration between the first damage information and the second damage information; and
calculate a difference between the first damage information and the second damage information after the registration,
wherein
in a case where a plurality of second images, each having an image capturing area that partially overlaps an image capturing area of the first image, and a plurality of pieces of second damage information extracted from the plurality of second images are acquired,
the processor is configured to:
  individually extract a plurality of feature points from the second images;
  individually search for corresponding feature points between the first image and each of the second images;
  individually perform registration between the first damage information and each of the pieces of second damage information;
  individually calculate differences between the first damage information and the pieces of second damage information; and
  combine the differences individually calculated between the first damage information and the pieces of second damage information.

11. The information processing apparatus according to claim 1, wherein the processor is configured to:
extract a region in which a difference between the first damage information and the second damage information is calculable, in the first image and the second image; and
output information on the extracted region.

12. The information processing apparatus according to claim 11, wherein the processor is configured to:
generate an image in which the region in which the difference is calculable is indicated in the first image and output the generated image to a display destination when outputting information on the region in which the difference is calculable.

13. An information processing apparatus, comprising a processor configured to:

acquire a first image obtained by capturing an image of a structure and first damage information of the structure extracted from the first image;

acquire a second image obtained by capturing an image of the structure at a time point different from a time point at which the first image is captured and second damage information of the structure extracted from the second image;

extract a plurality of feature points from the first image;

extract a plurality of feature points from the second image;

search for corresponding feature points between the first image and the second image;

perform coarse registration followed by fine registration on the first damage information and the second damage information on the basis of information on the corresponding feature points to perform registration between the first damage information and the second damage information; and calculate a difference between the first damage information and the second damage information after the registration, wherein in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the processor is configured to:

perform panoramic composition of the plurality of first images;

combine the plurality of pieces of first damage information on the basis of composition processing information for the panoramic composition of the plurality of first images;

perform panoramic composition of the plurality of second images;

combine the plurality of pieces of second damage information on the basis of composition processing information for the panoramic composition of the plurality of second images;

extract a plurality of feature points from a first image obtained after the panoramic composition;

extract a plurality of feature points from a second image obtained after the panoramic composition;

search for corresponding feature points between the first image obtained after the panoramic composition and the second image obtained after the panoramic composition;

perform registration between first damage information obtained after combining of the plurality of pieces of first damage information and second damage information obtained after combining of the plurality of pieces of second damage information; and calculate a difference between the first damage information obtained after combining of the plurality of pieces of first damage information and the second damage information obtained after combining of the plurality of pieces of second damage information.

14. The information processing apparatus according to claim 1, wherein the first damage information and the second damage information are acquired before the coarse registration is performed.

15. An information processing method comprising:

acquiring a first image obtained by capturing an image of a structure and first damage information of the structure extracted from the first image;

acquiring a second image obtained by capturing an image of the structure at a time point different from a time point at which the first image is captured and second damage information of the structure extracted from the second image;

extracting a plurality of feature points from the first image;

extracting a plurality of feature points from the second image;

searching for corresponding feature points between the first image and the second image;

performing coarse registration followed by fine registration on the first damage information and the second damage information on the basis of information on the corresponding feature points to perform registration between the first damage information and the second damage information; and calculating a difference between the first damage information and the second damage information after the registration, wherein in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the method comprises:

individually extracting a plurality of feature points from the first images;

individually extracting a plurality of feature points from the second images;

searching for corresponding feature points between a first image and a second image that correspond to each other among the first images and the second images;

performing registration between a piece of first damage information and a piece of second damage information that correspond to each other among the pieces of first damage information and the pieces of second damage information;

calculating a difference between the piece of first damage information and the piece of second damage information that correspond to each other;

acquiring composition processing information necessary for panoramic composition of the plurality of first images; and combining differences, each calculated between one of the first images and a corresponding one of the second images, on the basis of the composition processing information.

16. The information processing method according to claim 15, wherein the first damage information and the second damage information are acquired before the coarse registration is performed.

17. A non-transitory, computer-readable tangible recording medium which records thereon a program for causing, when read by a computer, the computer to implement:

acquiring a first image obtained by capturing an image of a structure and first damage information of the structure extracted from the first image;

acquiring a second image obtained by capturing an image of the structure at a time point different from a time point at which the first image is captured and second damage information of the structure extracted from the second image;

extracting a plurality of feature points from the first image;

extracting a plurality of feature points from the second image;

searching for corresponding feature points between the first image and the second image;

performing coarse registration followed by fine registration on the first damage information and the second damage information on the basis of information on the corresponding feature points to perform registration between the first damage information and the second damage information; and calculating a difference between the first damage information and the second damage information after the registration, wherein in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the computer is caused to implement:

individually extracting a plurality of feature points from the first images;

individually extracting a plurality of feature points from the second images;

searching for corresponding feature points between a first image and a second image that correspond to each other among the first images and the second images;

performing registration between a piece of first damage information and a piece of second damage information that correspond to each other among the pieces of first damage information and the pieces of second damage information;

calculating a difference between the piece of first damage information and the piece of second damage information that correspond to each other;

acquiring composition processing information necessary for panoramic composition of the plurality of first images; and combining differences, each calculated between one of the first images and a corresponding one of the second images, on the basis of the composition processing information.

18. An information processing method comprising:

acquiring a first image obtained by capturing an image of a structure and first damage information of the structure extracted from the first image;

acquiring a second image obtained by capturing an image of the structure at a time point different from a time point at which the first image is captured and second damage information of the structure extracted from the second image;

extracting a plurality of feature points from the first image;

extracting a plurality of feature points from the second image;

searching for corresponding feature points between the first image and the second image;

performing coarse registration followed by fine registration on the first damage information and the second damage information on the basis of information on the corresponding feature points to perform registration between the first damage information and the second damage information; and calculating a difference between the first damage information and the second damage information after the registration, wherein in a case where a plurality of second images, each having an image capturing area that partially overlaps an image capturing area of the first image, and a plurality of pieces of second damage information extracted from the plurality of second images are acquired, the method comprises:

individually extracting a plurality of feature points from the second images;

individually searching for corresponding feature points between the first image and each of the second images;

individually performing registration between the first damage information and each of the pieces of second damage information;

individually calculating differences between the first damage information and the pieces of second damage information; and combining the differences individually calculated between the first damage information and the pieces of second damage information.

19. An information processing method comprising:

acquiring a first image obtained by capturing an image of a structure and first damage information of the structure extracted from the first image;

acquiring a second image obtained by capturing an image of the structure at a time point different from a time point at which the first image is captured and second damage information of the structure extracted from the second image;

extracting a plurality of feature points from the first image;

extracting a plurality of feature points from the second image;

searching for corresponding feature points between the first image and the second image;

performing coarse registration followed by fine registration on the first damage information and the second damage information on the basis of information on the corresponding feature points to perform registration between the first damage information and the second damage information; and calculating a difference between the first damage information and the second damage information after the registration, wherein in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the method comprises:

performing panoramic composition of the plurality of first images;

combining the plurality of pieces of first damage information on the basis of composition processing information for the panoramic composition of the plurality of first images;

performing panoramic composition of the plurality of second images;

combining the plurality of pieces of second damage information on the basis of composition processing information for the panoramic composition of the plurality of second images;

extracting a plurality of feature points from a first image obtained after the panoramic composition;

extracting a plurality of feature points from a second image obtained after the panoramic composition;

searching for corresponding feature points between the first image obtained after the panoramic composition and the second image obtained after the panoramic composition;

performing registration between first damage information obtained after combining of the plurality of pieces of first damage information and second damage information obtained after combining of the plurality of pieces of second damage information; and calculating a difference between the first damage information obtained after combining of the plurality of pieces of first damage information and the second damage information obtained after combining of the plurality of pieces of second damage information.

20. A non-transitory, computer-readable tangible recording medium which records thereon a program for causing, when read by a computer, the computer to implement:

acquiring a first image obtained by capturing an image of a structure and first damage information of the structure extracted from the first image;

acquiring a second image obtained by capturing an image of the structure at a time point different from a time point at which the first image is captured and second damage information of the structure extracted from the second image;

extracting a plurality of feature points from the first image;

extracting a plurality of feature points from the second image;

searching for corresponding feature points between the first image and the second image;

performing coarse registration followed by fine registration on the first damage information and the second damage information on the basis of information on the corresponding feature points to perform registration between the first damage information and the second damage information; and calculating a difference between the first damage information and the second damage information after the registration, wherein in a case where a plurality of second images, each having an image capturing area that partially overlaps an image capturing area of the first image, and a plurality of pieces of second damage information extracted from the plurality of second images are acquired, the computer is caused to implement:

individually extracting a plurality of feature points from the second images;

individually searching for corresponding feature points between the first image and each of the second images;

individually performing registration between the first damage information and each of the pieces of second damage information;

individually calculating differences between the first damage information and the pieces of second damage information; and combining the differences individually calculated between the first damage information and the pieces of second damage information.

21. A non-transitory, computer-readable tangible recording medium which records thereon a program for causing, when read by a computer, the computer to implement:

acquiring a first image obtained by capturing an image of a structure and first damage information of the structure extracted from the first image;

acquiring a second image obtained by capturing an image of the structure at a time point different from a time point at which the first image is captured and second damage information of the structure extracted from the second image;

extracting a plurality of feature points from the first image;

extracting a plurality of feature points from the second image;

searching for corresponding feature points between the first image and the second image;

performing coarse registration followed by fine registration on the first damage information and the second damage information on the basis of information on the corresponding feature points to perform registration between the first damage information and the second damage information; and calculating a difference between the first damage information and the second damage information after the registration, wherein in a case where a plurality of first images obtained by capturing images of segments of the structure and a plurality of pieces of first damage information extracted from the plurality of first images are acquired, and a plurality of second images obtained by capturing images of the segments of the structure and a plurality of pieces of second damage information extracted from the plurality of second images are acquired, the computer is caused to implement:

performing panoramic composition of the plurality of first images;

combining the plurality of pieces of first damage information on the basis of composition processing information for the panoramic composition of the plurality of first images;

performing panoramic composition of the plurality of second images;

combining the plurality of pieces of second damage information on the basis of composition processing information for the panoramic composition of the plurality of second images;

extracting a plurality of feature points from a first image obtained after the panoramic composition;

extracting a plurality of feature points from a second
image obtained after the panoramic composition;
searching for corresponding feature points between the
first image obtained after the panoramic composition
and the second image obtained after the panoramic 5
composition;
performing registration between first damage informa-
tion obtained after combining of the plurality of
pieces of first damage information and second dam-
age information obtained after combining of the 10
plurality of pieces of second damage information;
and
calculating a difference between the first damage infor-
mation obtained after combining of the plurality of
pieces of first damage information and the second 15
damage information obtained after combining of the
plurality of pieces of second damage information.

\* \* \* \* \*

38